United States Patent
Yamada et al.

(10) Patent No.: US 12,498,568 B2
(45) Date of Patent: Dec. 16, 2025

(54) VEHICLE DISPLAY DEVICE

(71) Applicant: Yazaki Corporation, Tokyo (JP)

(72) Inventors: Yoshihisa Yamada, Shizuoka (JP); Terukazu Kuboyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 343 days.

(21) Appl. No.: 18/476,398

(22) Filed: Sep. 28, 2023

(65) Prior Publication Data

US 2024/0019697 A1    Jan. 18, 2024

Related U.S. Application Data

(63) Continuation of application No. PCT/JP2022/036390, filed on Sep. 29, 2022.

(30) Foreign Application Priority Data

Oct. 29, 2021    (JP) ................. 2021-177021

(51) Int. Cl.
| | |
|---|---|
| *G02B 27/01* | (2006.01) |
| *B60K 35/22* | (2024.01) |
| *B60K 35/60* | (2024.01) |
| *B60K 37/20* | (2024.01) |

(52) U.S. Cl.
CPC .......... *G02B 27/0101* (2013.01); *B60K 35/22* (2024.01); *B60K 35/60* (2024.01); *B60K 37/20* (2024.01); *G02B 2027/013* (2013.01)

(58) Field of Classification Search
None
See application file for complete search history.

(56) References Cited

U.S. PATENT DOCUMENTS

| | | | |
|---|---|---|---|
| 2009/0231720 A1* | 9/2009 | Chengalva | G02B 27/0101 359/630 |
| 2012/0256812 A1 | 10/2012 | Aoki et al. | |
| 2013/0188260 A1* | 7/2013 | Matsushita | G02B 27/01 359/632 |
| 2016/0178900 A1* | 6/2016 | Kawaguchi | G02B 27/0149 250/215 |

(Continued)

FOREIGN PATENT DOCUMENTS

| | | |
|---|---|---|
| JP | 2011-128450 A | 6/2011 |
| JP | 005961372 B2 | 8/2016 |

(Continued)

*Primary Examiner* — Ryan Crockett
(74) *Attorney, Agent, or Firm* — Sughrue Mion, PLLC

(57) ABSTRACT

A vehicle display device includes an image display device in which an upper display area is disposed to face an eye point of a vehicle, a combiner, an accommodating part that accommodates a lower display area of the image display device and is formed with an opening, and a reflective member that reflects the lower display area toward the combiner. When viewed from the eye point, a first image, which is an image of the opening reflected in the combiner, overlaps the upper display area, and a boundary line of the first image has gaps of first widths between the first image and the upper display area. The first image overlaps a second image which is an image of the lower display area reflected in the combiner, and the boundary line of the first image has gaps second widths between the first image and the second image.

8 Claims, 18 Drawing Sheets

(56) References Cited

U.S. PATENT DOCUMENTS

| | | | |
|---|---|---|---|
| 2017/0031162 A1* | 2/2017 | Konishi | G02B 30/52 |
| 2019/0265472 A1* | 8/2019 | Sugiyama | G02B 27/0101 |
| 2020/0183160 A1* | 6/2020 | Hartwig | G02B 27/0103 |
| 2020/0264430 A1 | 8/2020 | Sugiyama et al. | |
| 2021/0165220 A1* | 6/2021 | Nakada | B60K 35/233 |
| 2021/0360211 A1* | 11/2021 | Kawamura | G02B 27/0101 |
| 2022/0342230 A1* | 10/2022 | Chen | G02B 27/0101 |
| 2023/0011407 A1* | 1/2023 | Lee | B60K 35/211 |
| 2023/0088007 A1* | 3/2023 | Hartwig | B60K 35/60 |
| | | | 359/632 |
| 2023/0266588 A1* | 8/2023 | Zhou | B60K 35/28 |
| | | | 345/7 |
| 2023/0415572 A1* | 12/2023 | Yamada | G02B 27/0149 |
| 2025/0035927 A1* | 1/2025 | Yamada | B60K 35/23 |

FOREIGN PATENT DOCUMENTS

| | | |
|---|---|---|
| JP | 2017-222235 A | 12/2017 |
| JP | 2020-131829 A | 8/2020 |
| WO | 2016/013081 A1 | 1/2016 |

* cited by examiner

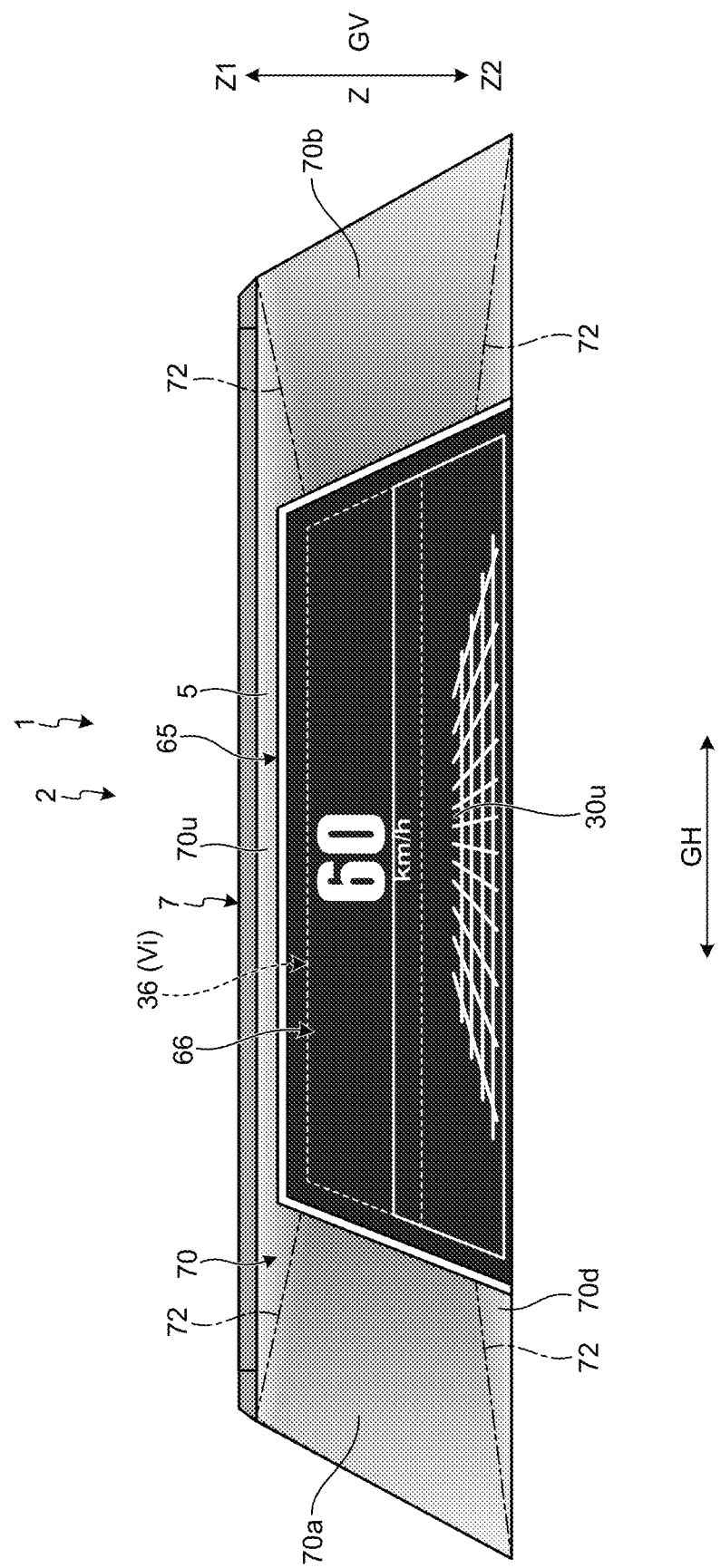

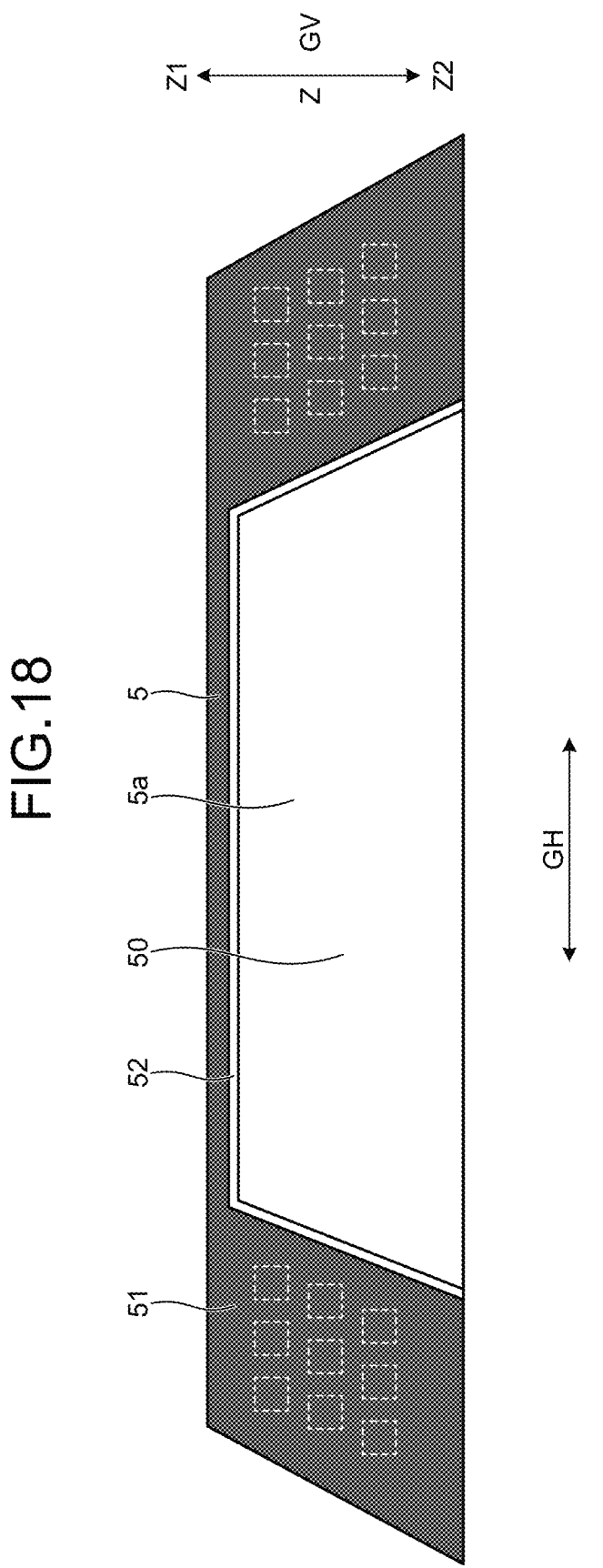

VEHICLE DISPLAY DEVICE

CROSS-REFERENCE TO RELATED APPLICATION

This application is a continuation application of International Application No. PCT/JP2022/036390 filed on Sep. 29, 2022 which claims the benefit of priority from Japanese Patent Application No. 2021-177021 filed on Oct. 29, 2021 and designating the U.S., the entire contents of which are incorporated herein by reference.

BACKGROUND OF THE INVENTION

1. Field of the Invention

The present invention relates to a vehicle display device.

2. Description of the Related Art

Conventionally, vehicle display devices including combiners are known. Japanese Patent No. 5961372 discloses a vehicle display device including a display device main body that emits display light and a combiner fixed to an upper part of the display device main body and projected with the display light emitted from the display device main body. In the vehicle display device of Japanese Patent No. 5961372, the display light is emitted outside a housing through a front glass of an opening of the housing and irradiated to a display area of the combiner.

When the display light is projected toward the combiner from the display device through an opening formed in a wall surface of an instrument panel or the like, an image display area of the display device and an opening surrounding the image display area are reflected in the combiner. When the shape of the opening reflected in the combiner is not in harmony with the shape of the image display area, designability may be deteriorated.

SUMMARY OF THE INVENTION

An object of the present invention is to provide a vehicle display device that can improve designability.

A vehicle display device according to one aspect of the present invention includes an image display device including an upper display area and a lower display area displaying an image, the upper display area being disposed to face an eye point of a vehicle; a combiner disposed on a side of the eye point with respect to the upper display area; an accommodating part that accommodates the lower display area and is formed with an opening facing upward, the opening being located on the side of the eye point with respect to the image display device; a hood part that covers the upper display area from above; and a reflective member disposed inside the accommodating part, facing the combiner through the opening, and reflecting the lower display area toward the combiner, wherein the combiner reflects the lower display area and the opening reflected by the reflective member toward the eye point, respectively, when viewed from the eye point, a first image overlaps the upper display area and a boundary line of the first image has a gap of a first width between the first image and the upper display area in an image horizontal direction, the first image being an image of the opening reflected in the combiner, when viewed from the eye point, the first image overlaps a second image and the boundary line of the first image has a gap of a second width between the first image and the second image in the image horizontal direction, the second image being an image of the lower display area reflected in the combiner, and a shape of the upper display area and a shape of the lower display area are shapes in which the first width and the second width are made equal to each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a view illustrating an image reflected in a combiner according to the third modification of the embodiment; and FIG. 18 is a front view of a combiner according to a fourth modification of the embodiment.

DETAILED DESCRIPTION OF THE PREFERRED EMBODIMENTS

A vehicle display device according to an embodiment of the present invention is described in detail below with reference to the drawings. Note that the invention is not limited by this embodiment. Components in the following embodiment include those that can be easily assumed by those skilled in the art or are substantially the same.

EMBODIMENT

Figure 1:
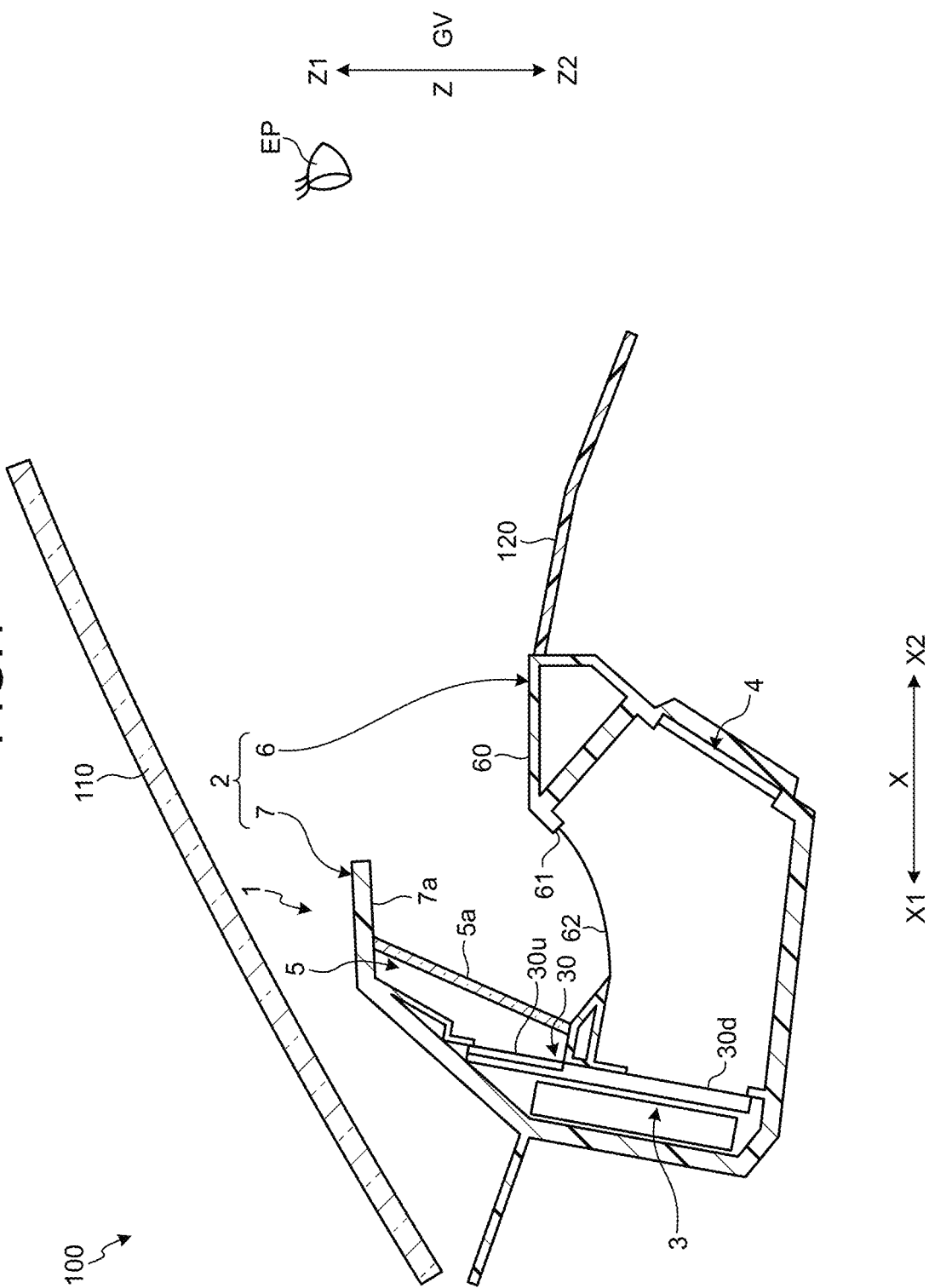
FIG. 1 is a schematic configuration diagram of a vehicle display device according to an embodiment.
Figure 2:
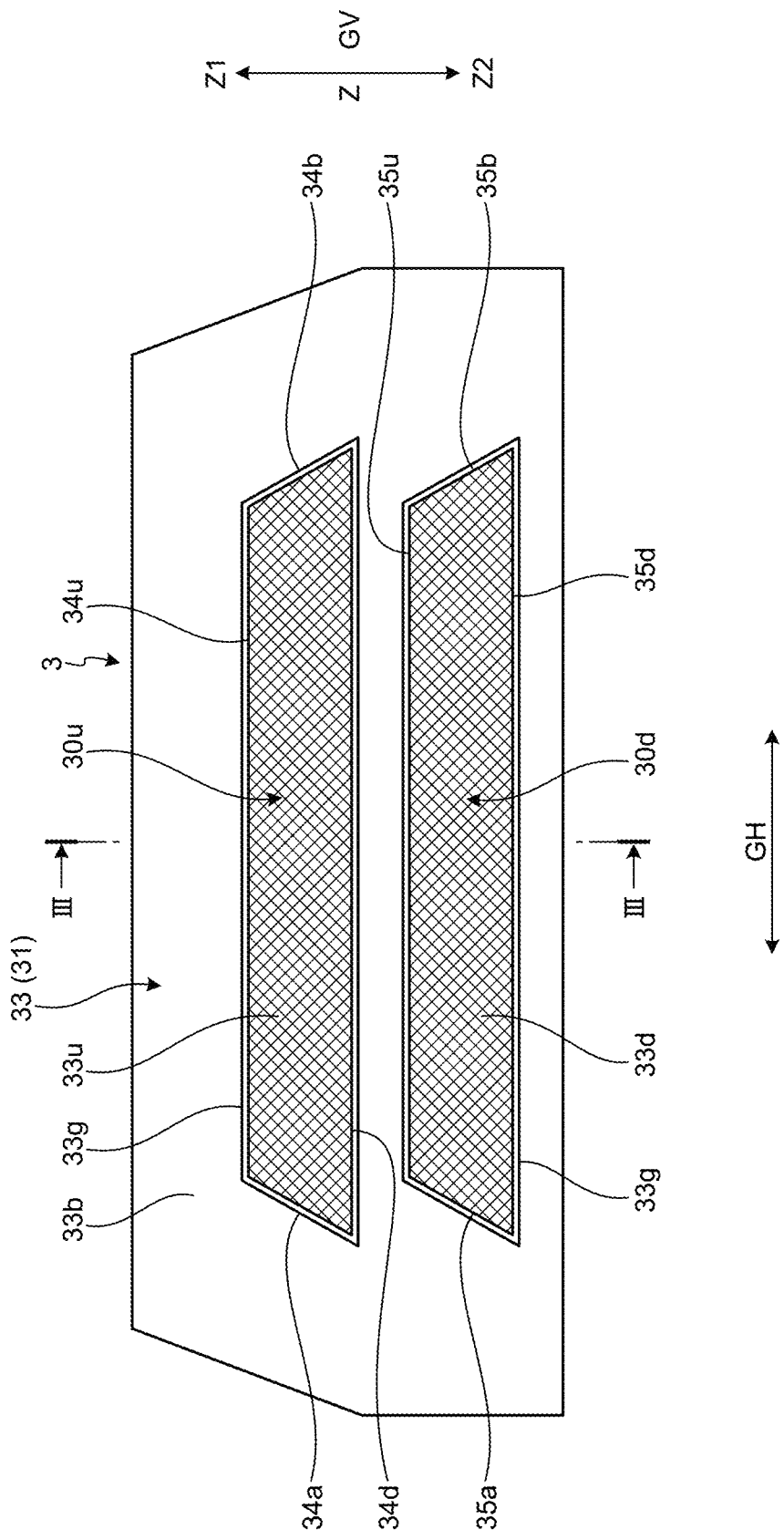
FIG. 2 is a front view of a mask member according to the embodiment.
Figure 3:
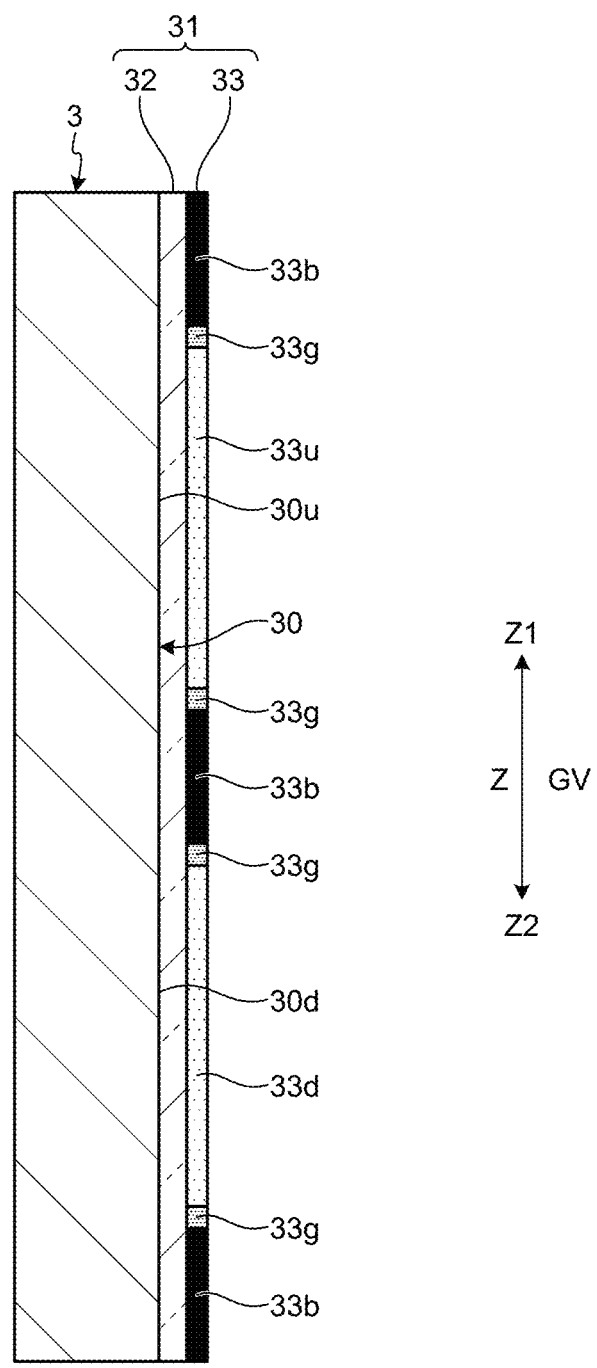
FIG. 3 is a cross-sectional view of an image display device according to the embodiment.
Figure 4:
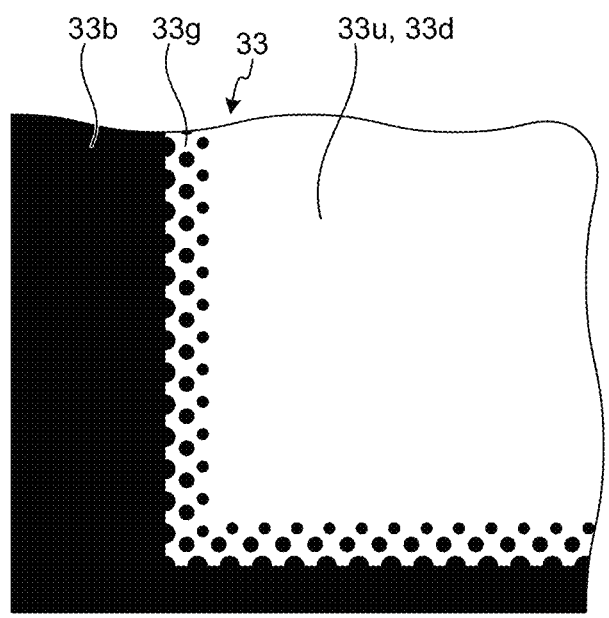
FIG. 4 is a partially enlarged view of the mask member according to the embodiment.
Figure 5:
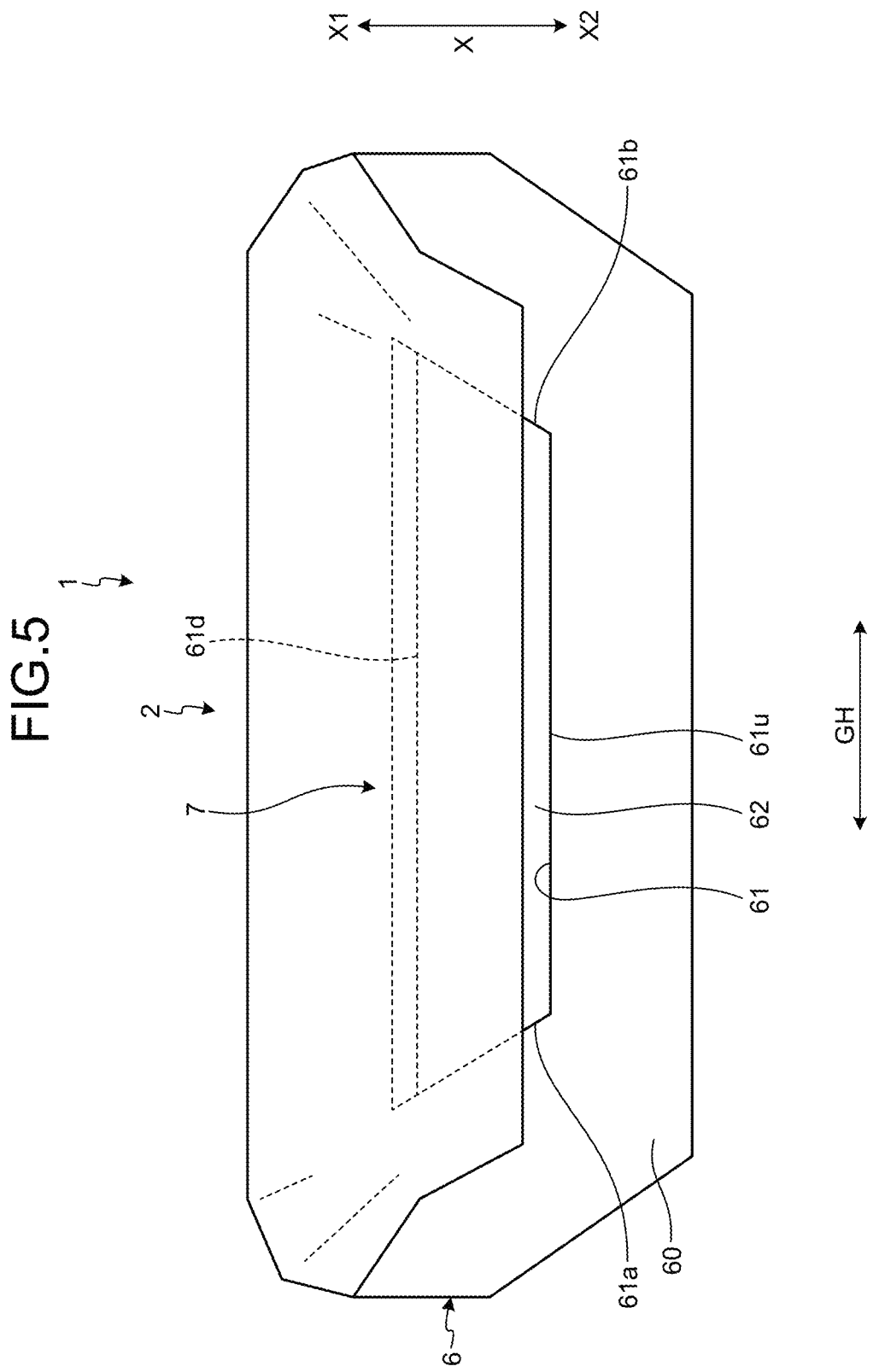
FIG. 5 is a plan view of a hood part and an accommodating part according to the embodiment.
Figure 6:
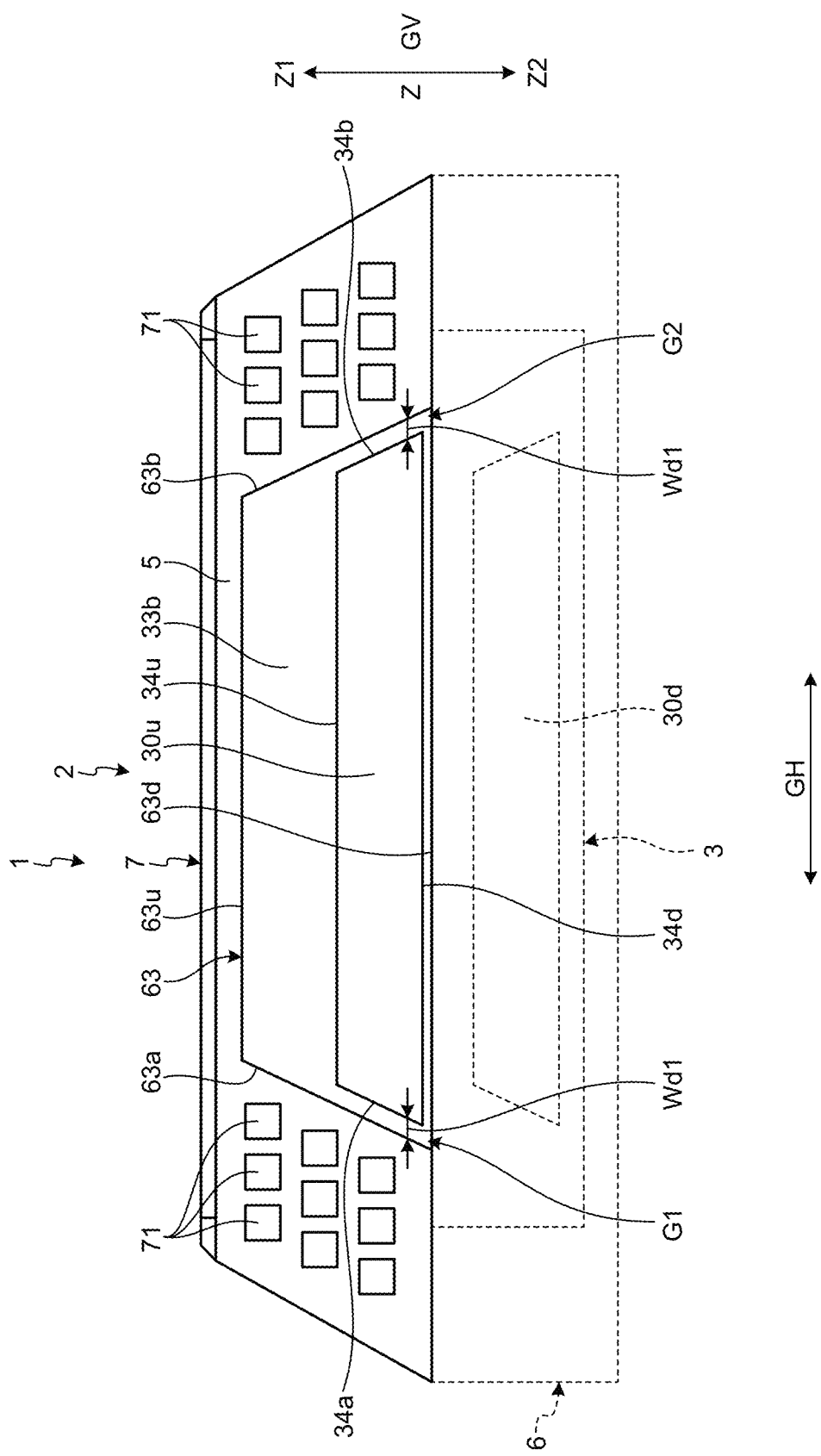
FIG. 6 is a front view of the vehicle display device according to the embodiment.
Figure 7:
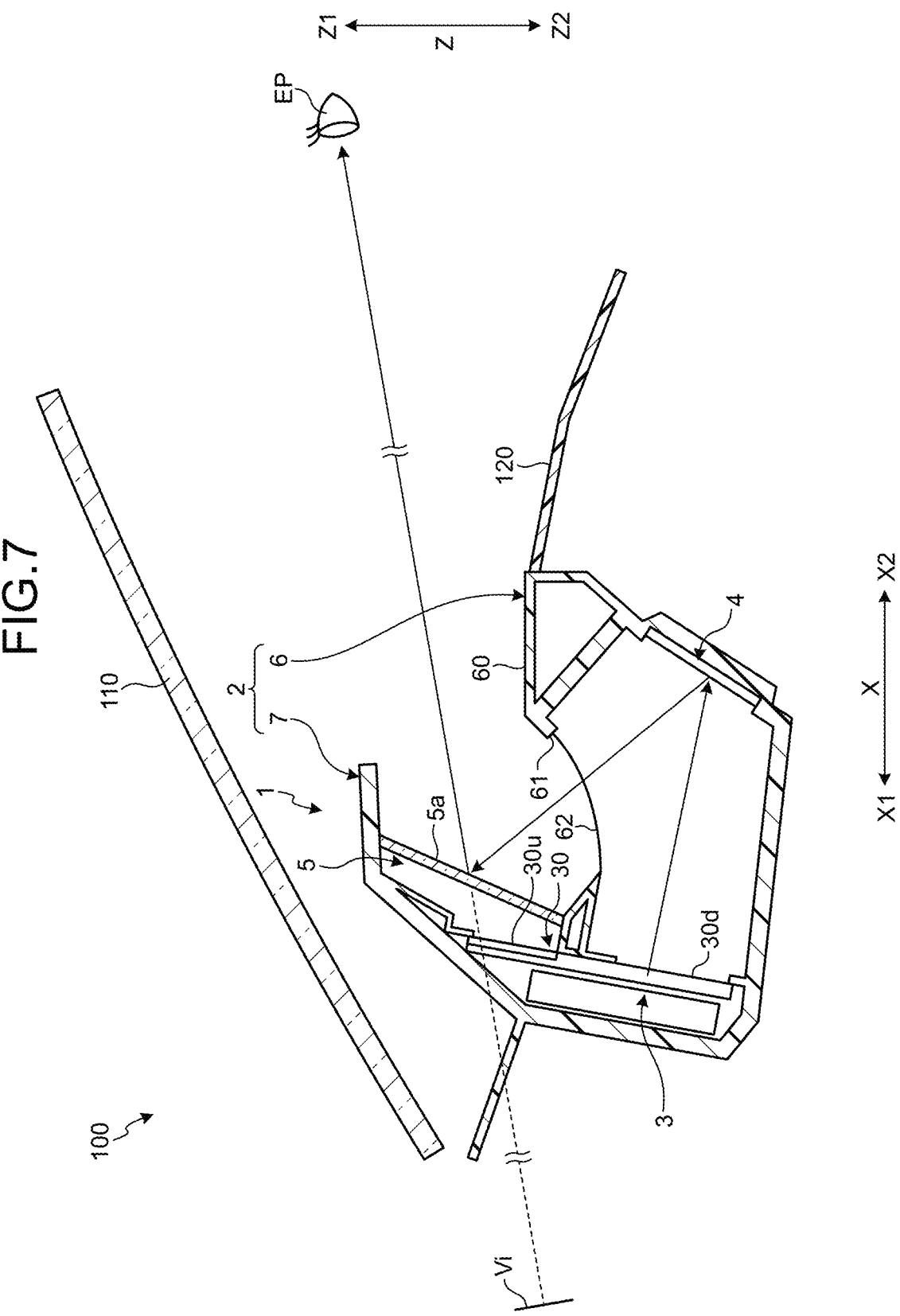
FIG. 7 is a view illustrating an optical path of virtual image display of the vehicle display device according to the embodiment.
Figure 8:
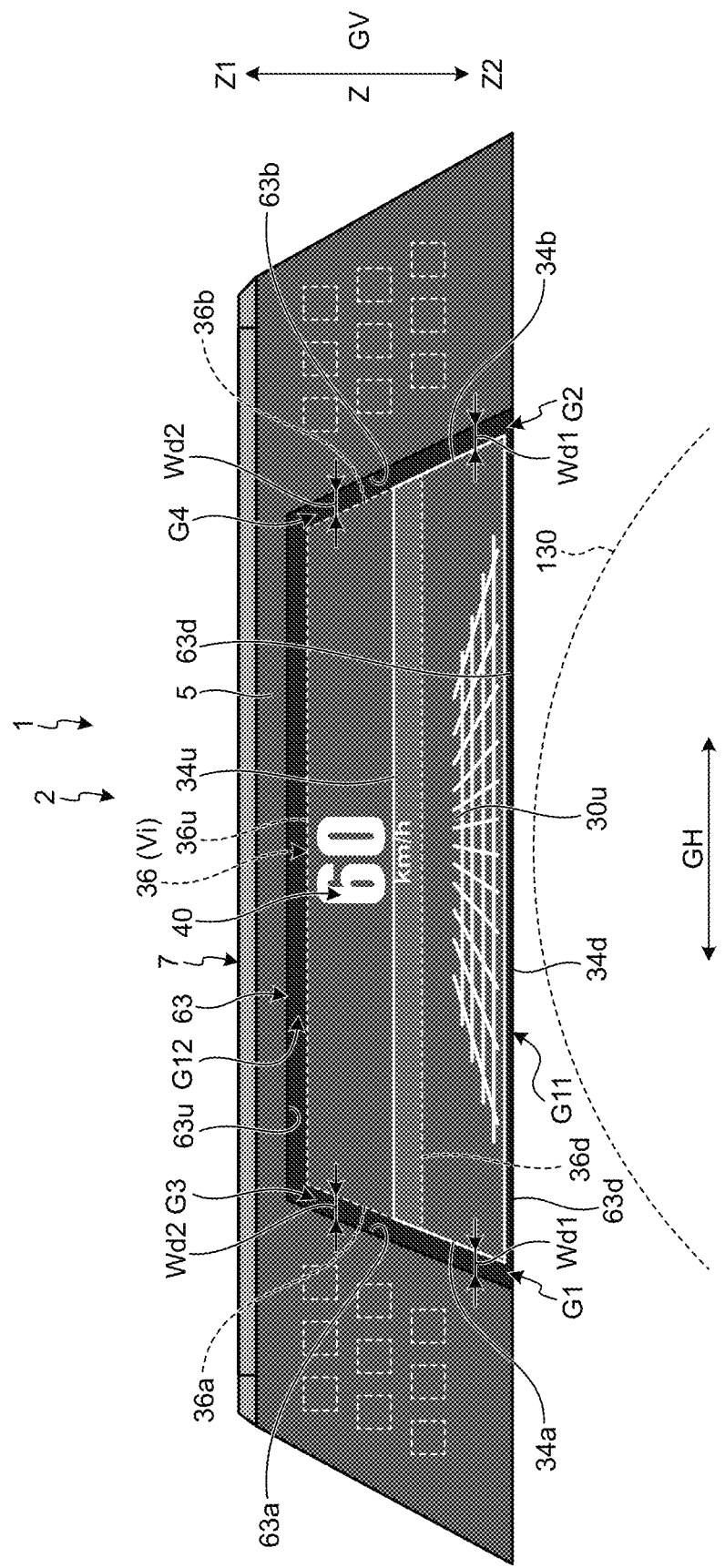
FIG. 8 is a view illustrating an image reflected in a combiner of the embodiment.

With reference to FIGS. 1 to 8, the embodiment is described. The present embodiment relates to a vehicle display device. FIG. 1 is a schematic configuration diagram of a vehicle display device according to an embodiment, FIG. 2 is a front view of a mask member according to the embodiment, FIG. 3 is a cross-sectional view of an image display device according to the embodiment. FIG. 4 is a partially enlarged view of the mask member according to the embodiment, FIG. 5 is a plan view of a hood part and an accommodating part according to the embodiment, FIG. 6 is a front view of the vehicle display device according to the embodiment, FIG. 7 is a view illustrating an optical path of virtual image display of the vehicle display device according to the embodiment, and FIG. 8 is a view illustrating an image reflected in a combiner of the embodiment. FIG. 3 illustrates a cross section taken along line III-III in FIG. 2.

As illustrated in FIG. 1, a vehicle display device 1 has a housing 2, an image display device 3, a reflective member 4, and a combiner 5. The vehicle display device 1 is mounted on a vehicle 100 such as an automobile. The vehicle display device 1 of the present embodiment is a meter device that displays a virtual image in front of a driver by means of the combiner 5. The illustrated vehicle display device 1 is disposed on an instrument panel 120. The vehicle display device 1 of the present embodiment is configured to display a real image and a virtual image with respect to an eye point EP of the vehicle 100. More specifically, the vehicle display device 1 allows the driver to visually recognize, as a real image, an image displayed on an upper part of the image display device 3, and to visually recognize, as a virtual image, an image displayed on a lower part of the image display device 3. Note that the eye point EP is a position assumed in advance as a position of an eye of the driver or an actual position of the eye of the driver.

The housing 2 has an accommodating part 6 and a hood part 7. The accommodating part 6 and the hood part 7 may be integrally formed with each other or separate members. The accommodating part 6 is accommodated in the instrument panel 120. The accommodating part 6 has a box shape and has a light-shielding property. The accommodating part 6 has an instrument panel surface 60 formed with an opening 61. The instrument panel surface 60 and the opening 61 are located at an upper part of the accommodating part 6 and face upward. A transparent cover 62 is placed over the opening 61. The cover 62 has a curved shape toward the inside of the accommodating part 6. The cover 62 is formed to reflect external light toward a light-shielding wall. For example, the cover 62 reflects external light transmitted through a windshield 110 toward a wall surface of the hood part 7 or a direction other than the eye point.

In the following description, a front side in a vehicle front-rear direction X is referred to as a "front side X1" and a rear side in the vehicle front-rear direction X is referred to as a "rear side X2". An upper side in a vehicle vertical direction Z is referred to as an "upper side Z1" and a lower side in the vehicle vertical direction Z is referred to as a "lower side Z2". An image vertical direction GV of an image displayed by the vehicle display device 1 corresponds to the vehicle vertical direction Z.

The image display device 3 is a device that displays images, and is, for example, a liquid crystal display device such as a thin film transistor-liquid crystal display (TFT-LCD). The image display device 3 has a backlight unit, and outputs display light using light from the backlight unit. The image display device 3 has an upper display area 30u and a lower display area 30d. The upper display area 30u and the lower display area 30d are light-emitting areas that output the display light. The upper display area 30u is located on the upper side Z1 in a display surface 30 of the image display device 3. The lower display area 30d is located on the lower side Z2 in the display surface 30.

The image display device 3 is disposed with the upper display area 30u facing the eye point EP. The image display device 3 is fixed to and held by the housing 2, for example. As illustrated in FIG. 1, the accommodating part 6 accommodates the lower display area 30d and holds the image display device 3. The image display device 3 is disposed at an end of the accommodating part 6 on the front side X1, with the display surface 30 facing the rear side X2. The upper display area 30u protrudes upward from the accommodating part 6.

As illustrated in FIGS. 2 and 3, a mask member 31 is disposed in front of the image display device 3. The mask member 31 is disposed on the display surface 30 and covers the entire display surface 30. The mask member 31 forms the upper display area 30u and the lower display area 30d on the display surface 30. As illustrated in FIG. 3, the mask member 31 has a transparent sheet 32 and a printed layer 33. The sheet 32 is molded from a resin such as polycarbonate, for example. The printed layer 33 is formed by printing on the sheet 32. The printed layer 33 has an upper transmission area 33u, a lower transmission area 33d, a light-shielding area 33b, and a gradation area 33g.

The upper transmission area 33u and the lower transmission area 33d are areas through which display light of an image displayed on the display surface 30 is transmitted. The illustrated two transmission areas 33u and 33d are formed by smoke-colored ink. Note that the transmission areas 33u and 33d may be colorless and transparent. In this case, for example, the printed layer 33 is formed in an area excluding the transmission areas 33u and 33d.

The light-shielding area 33b is formed by light-shielding ink. The light-shielding area 33b is, for example, a black or dark-colored area and blocks the display light. The gradation area 33g is formed at the boundary between the transmission areas 33u and 33d and the light-shielding area 33b. The gradation area 33g is formed so that the transmittance of the displayed light gradually increases toward the transmission areas 33u and 33d from the light-shielding area 33b. The gradation area 33g is formed, for example, by halftone dot printing with a large number of dots as illustrated in FIG. 4.

As illustrated in FIG. 2, the shape of the upper display area 30u is trapezoidal. The shape of the upper display area 30u is determined according to the shape of a first image 63 to be described below. The first image 63 is an image of the opening 61 reflected in the combiner 5. The upper display area 30u decreases in length in an image horizontal direction GH toward the upper side Z1. The image horizontal direction GH is the horizontal direction of an image displayed in the upper display area 30u and the lower display area 30d. The image horizontal direction GH is, for example, along a vehicle width direction. The upper display area 30u has a first lateral side 34a, a second lateral side 34b, an upper side 34u, and a lower side 34d.

The upper side 34u is a boundary line of the upper display area 30u on the upper side Z1. The lower side 34d is a boundary line of the upper display area 30u on the lower side Z2. The illustrated upper side 34u and lower side 34d extend linearly along the image horizontal direction GH.

The first lateral side 34a is a left boundary line of the upper display area 30u when viewed from the eye point EP. The second lateral side 34b is a right boundary line of the upper display area 30u when viewed from the eye point EP. The first lateral side 34a and the second lateral side 34b are each inclined with respect to the vehicle vertical direction Z. More specifically, the first lateral side 34a and the second lateral side 34b are inclined to approach each other toward the upper side Z1. The illustrated first lateral side 34a and second lateral side 34b extend linearly.

As illustrated in FIG. 2, the shape of the lower display area 30d is trapezoidal. The shape of the lower display area 30d is determined according to the shape of the first image 63. The lower display area 30d decreases in length in the image horizontal direction GH toward the upper side Z1. The lower display area 30d has a first lateral side 35a, a second lateral side 35b, an upper side and a lower side 35d.

The upper side 35u is a boundary line of the lower display area 30d on the upper side Z1. The lower side 35d is a boundary line of the lower display area 30d on the lower side Z2. The illustrated upper side 35u and lower side 35d extend linearly along the image horizontal direction GH.

The first lateral side 35a is a left boundary line of the lower display area 30d when viewed from the eye point EP. The second lateral side 35b is a right boundary line of the lower display area 30d when viewed from the eye point EP. The first lateral side 35a and the second lateral side 35b are each inclined to the image vertical direction GV. More specifically, the first lateral side and the second lateral side 35b are inclined to approach each other toward the upper side Z1. The illustrated first lateral side 35a and second lateral side extend linearly. A gap is provided between the upper display area 30u and the lower display area 30d.

As illustrated in FIG. 5, the shape of the opening 61 in the present embodiment is trapezoidal. The width of the opening 61 in the image horizontal direction GH narrows toward the rear side X2. The opening 61 has a top side 61u, a bottom side 61d, a first oblique side 61a, and a second oblique side 61b. The top side 61u is a boundary line of the opening 61 on the rear side X2. The bottom side 61d is a boundary line of the opening 61 on the front side X1.

The first oblique side 61a and the second oblique side 61b are boundary lines of the opening 61 in the image horizontal direction GH. The first oblique side 61a and the second oblique side 61b face each other in the image horizontal direction GH. The first oblique side 61a and the second oblique side 61b are inclined with respect to the vehicle front-rear direction X. More precisely, the first oblique side 61a and the second oblique side 61b are inclined to approach to each other toward the rear side X2.

As illustrated in FIG. 6, the hood part 7 is disposed on the upper side Z1 with respect to the accommodating part 6. The shape of the hood part 7 in the front view is trapezoidal. The length of the hood part 7 in the image horizontal direction GH decreases toward the upper side Z1. The upper display area 30u protrudes from the accommodating part 6 toward the upper side Z1, and is covered with the hood part 7 from the upper side Z1.

As illustrated in FIG. 1, the combiner 5 is disposed on the side of the eye point EP with respect to the upper display area 30u. The illustrated combiner 5 is held by a case member (not illustrated). The combiner 5 is configured by a half-mirror, for example. The combiner 5 can transmit the display image of an image displayed in the upper display area 30u toward the eye point EP. The combiner 5 has a reflective surface 5a facing the eye point EP. The shape of the combiner 5 in the front view is trapezoidal, similar to the shape of the hood part 7. The combiner 5 reflects the instrument panel surface 60 and the opening 61 of the accommodating part 6 toward the eye point EP. That is, a driver can visually recognize the instrument panel surface 60 and the opening 61 due to the reflection in the combiner 5.

FIG. 6 illustrates the first image 63 which is an image of the opening 61 reflected in the combiner 5. The first image 63 has a first oblique side 63a, a second oblique side 63b, a top side 63u, and a bottom side 63d. The first oblique side 63a, the second oblique side 63b, the top side 63u, and the bottom side 63d are images of the first oblique side 61a, the second oblique side 61b, the top side 61u, and the bottom side 61d of the opening 61. The first oblique side 63a is a left boundary line of the first image 63 when viewed from the eye point EP. The second oblique side 63b is a right boundary line of the first image 63 when viewed from the eye point EP. The first oblique side 63a and the second oblique side 63b of the first image 63 are inclined with respect to the image vertical direction GV to approach each other toward the upper side Z1.

The upper display area 30u overlaps the first image 63 and is visually recognized. In other words, the shape of the upper display area 30u is determined so that the first image 63 and the upper display area 30u overlap each other. The illustrated first image 63 overlaps the entire upper display area 30u. That is, the position and size of the opening 61 are determined so that the upper display area and the light-shielding area 33b around the upper display area 30u overlap the first image 63.

The shape of the first image 63 is analogous or similar to the shape of the hood part 7. A tell-tale 71 is displayed on the side of the first image 63. The tell-tale 71 may be displayed on the hood part 7 as a real image or as a virtual image.

As illustrated in FIG. 6, the upper display area 30u overlaps the lower part of the first image 63 in the front view. The shape of the upper display area 30u in the present embodiment is such that the first lateral side 34a is parallel to the first oblique side 63a of the first image 63 and the second lateral side 34b is parallel to the second oblique side 63b of the first image 63. Moreover, the upper side 34u is parallel to the top side 63u of the first image 63 and the lower side 34d is parallel to the bottom side 63d of the first image 63.

The boundary line of the first image 63 has gaps G1 and G2 of first widths Wd1 between the first image 63 and the upper display area 30u in the image horizontal direction GH. The gap G1 is a gap between the first oblique side 63a and the first lateral side 34a in the image horizontal direction GH. The gap G2 is a gap between the second oblique side 63b and the second lateral side 34b in the image horizontal direction GH. That is, when viewed from the eye point EP, the gap G1 is located on the left side of the upper display area 30u and the gap G2 is located on the right side of the upper display area 30u. The position and shape of the upper display area 30u are determined so that the left and right gaps G1 and G2 are made equal to each other. Note that the first width Wd1 of the gap G1 and the first width Wd1 of the gap G2 are equal to each other, for example, when the eye point EP is located in the center of an eye range.

As illustrated in FIG. 7, the reflective member 4 is disposed inside the accommodating part 6, and faces the reflective surface 5a of the combiner 5 through the opening 61. The reflective member 4 is disposed at an end of the accommodating part 6 on the rear side X2, and faces the lower display area 30d. The reflective member 4 reflects the lower display area 30d toward the combiner 5. The reflective member 4 is disposed on the rear side X2 from a position where the tip of the hood part 7 and the top side 61*u* of the opening 61 are connected by a straight line, so that sunlight entering from the opening 61 does not directly hit the reflective member 4. The reflective surface 5*a* of the combiner 5 reflects an image of the lower display area 30*d* toward the eye point EP. A virtual image Vi visually recognized at the eye point EP is formed at a position on the front side X1 from the reflecting surface 5*a*. The virtual image Vi is a virtual image of the lower display area 30*d*, and includes an image displayed in the lower display area 30*d*.

As illustrated in FIG. 8, the hood part 7 is located above a steering wheel 130 when viewed from the eye point EP. FIG. 8 illustrates a second image 36 which is an image of the lower display area 30*d* reflected in the combiner 5. A driver visually recognizes the second image 36 as the virtual image Vi. The second image 36 has a first lateral side 36*a*, a second lateral side 36*b*, an upper side 36*u*, and a lower side 36*d*. The first lateral side 36*a*, the second lateral side 36*b*, the upper side 36*u*, and the lower side 36*d* are images of the first lateral side 35*a*, the second lateral side 35*b*, an upper side 35*u*, and a lower side 35*d* of the lower display area 30*d*.

The first lateral side 36*a* is a left boundary line of the second image 36 when viewed from the eye point EP. The second lateral side 36*b* is a right boundary line of the second image 36 when viewed from the eye point EP. The upper side 36*u* is a boundary line of the second image 36 on the upper side Z1. The lower side 36*d* is a boundary line of the second image 36 on the lower side Z2. The first lateral side 36*a* and the second lateral side 36*b* are inclined with respect to the image vertical direction GV to approach each other toward the upper side Z1.

The lower display area 30*d* is a light-emitting area that outputs display light. In the lower display area 30*d*, light from a backlight unit slightly penetrates even black areas where no image is displayed. Therefore, the second image 36 is brighter than its surroundings. That is, a user can visually recognize the outline of the second image 36. Similarly, in the upper display area 30*u*, light from the backlight unit slightly penetrates even black areas where no image is displayed. Therefore, the upper display area 30*u* is brighter than its surroundings. That is, a user can visually recognize the outline of the upper display area 30*u*.

When viewed from the eye point EP, the first image 63 overlaps the second image 36. The entire second image 36 overlaps the first image 63 when viewed from the eye point EP. The first lateral side 36*a* of the second image 36 is parallel to the first oblique side 63*a* of the first image 63. The second lateral side 36*b* is parallel to the second oblique side 63*b*. The upper side 36*u* and the lower side 36*d* are parallel to the top side 63*u* and the bottom side 63*d*, respectively.

The boundary line of the first image 63 has gaps G3 and G4 of second widths Wd2 between the first image 63 and the second image 36 in the image horizontal direction GH. The gap G3 is a gap between the first oblique side 63*a* of the first image 63 and the first lateral side 36*a* of the second image 36 in the image horizontal direction GH. The gap G4 is a gap between the second oblique side 63*b* and the second lateral side 36*b* in the image horizontal direction GH. That is, when viewed from the eye point EP, the gap G3 is located on the left side of the second image 36 and the gap G4 is located on the right side of the second image 36. The vehicle display device 1 of the present embodiment is configured so that the left and right gaps G3 and G4 of the second image 36 are equal to each other. Note that the width Wd2 of the gap G3 and the width Wd2 of the gap G4 are equal to each other when, for example, the eye point EP is located in the center of the eye range.

As illustrated in FIG. 8, the second image 36 is located on the upper side Z1 with respect to the upper display area 30*u*. A part of the illustrated second image 36 on the lower side Z2 overlaps the upper display area That is, a part of the virtual image Vi is superimposed on a real image of the upper display area 30*u* for display. The second image 36 includes a speed image 40 indicating the speed at which the vehicle 100 is traveling.

In the vehicle display device 1 of the present embodiment, the first width Wd1 and the second width Wd2 have similar values. For example, the gap G1 and the gap G3, which are located on the left side when viewed from the eye point EP, have the same width in the image horizontal direction GH. That is, the gaps G3 and G1 continuous with the same width are formed from an upper end of the second image 36 to a lower end of the upper display area 30*u*. The gaps G2 and G4 located on the right side also have the same width in the image horizontal direction GH. That is, the gaps G4 and G2 continuous with the same width are formed from the upper end of the second image 36 to the lower end of the upper display area 30*u*. The vehicle display device 1 of the present embodiment can improve designability as will be described below.

As a comparative example, a configuration in which an opening, an upper display area, and a lower display area are all rectangular and the upper display area and the lower display area have the same width is considered. In the comparative example, the width of a virtual image in the lower display area is smaller than that of a real image in the upper display area. In this case, the shapes of three parties when viewed from the eye point EP are not in harmony, giving a user a sense of discomfort. For example, the widths of the gaps G1, G2, G3, and G4 are not uniform, leading to poor designability. On the other hand, in the vehicle display device 1 of the present embodiment, the gaps G1 and G3 have uniform widths and the gaps G2 and G4 have uniform widths. As a result, the shape of the second image 36 and the shape of the upper display area 30*u* are in harmony with the shape of the first image 63. Thus, a driver is less likely to feel a sense of discomfort, and the designability of the vehicle display device 1 is improved.

The boundary line of the first image 63 has a gap G11 between the first image 63 and the upper display area 30*u* in the image vertical direction GV. The gap G11 is a gap between the bottom side 63*d* of the first image 63 and the lower side 34*d* of the upper display area 30*u*. The first image 63 has a gap G12 between the first image 63 and the second image 36 in the image vertical direction GV. The gap G12 is a gap between the top side 63*u* of the first image 63 and the upper side 36*u* of the second image 36. The width of the gap G12 may be the same size as the first width Wd1 and the second width Wd2. The width of the gap G11 may also be the same size as the first width Wd1 and the second width Wd2.

In vehicle display device 1 of the present embodiment, the upper display area 30*u* and the lower display area 30*d* are formed by one flat mask member 31. With such a configuration, the internal structure of the accommodating part 6 is less likely to be reflected. As a comparative example, a mask member with openings corresponding to the upper display area 30*u* and the lower display area 30*d* is considered. In the mask member of the comparative example, a stepped surface of the opening may be illuminated by external light entering the inside of the accommodating part 6. As a result, the stepped surface may be reflected in the combiner 5 and be visually recognized from the eye point EP. On the other hand, in the vehicle display device 1 of the present embodiment, since the mask member 31 has no stepped surface, reflection is less likely to occur.

Note that the accommodating part 6 has a holding structure for holding the mask member 31, but the holding structure is disposed at a position where no reflection occurs. In other words, the holding structure holds the mask member 31 at a position not visually recognizable from the eye point EP.

The mask member 31 of the present embodiment is provided with the gradation area 33g. Thus, the boundaries between the upper display area 30u and the gaps G1 and G2 are blurred and less noticeable. The boundaries between the second image 36 and the gaps G3 and G4 are also blurred and less noticeable. Thus, the mask member 31 of the present embodiment can improve the designability of the vehicle display device 1.

As described above, the vehicle display device 1 of the present embodiment has the image display device 3, the combiner 5, the accommodating part 6, the hood part 7, and the reflective member 4. The image display device 3 has the upper display area 30u and the lower display area 30d for displaying images, with the upper display area 30u disposed to face the eye point EP of the vehicle 100. The combiner 5 is disposed on the side of the eye point EP with respect to the upper display area 30u. The accommodating part 6 accommodates the lower display area 30d and has the opening 61 facing upward. The opening 61 is located on the side of the eye point EP with respect to the image display device 3.

The hood part 7 covers the upper display area 30u from above. The reflective member 4 is disposed inside the accommodating part 6, and faces the combiner 5 through the opening 61. The combiner 5 reflects the lower display area 30d toward the combiner 5. The combiner 5 reflects the lower display area 30d and the opening 61 reflected by the reflective member 4 toward the eye point EP, respectively.

When viewed from the eye point EP, the first image 63, which is an image of the opening 61 reflected in the combiner 5, overlaps the upper display area 30u. The boundary line of the first image 63 has the gaps G1 and G2 of the first widths Wd1 between the first image 63 and the upper display area 30u in the image horizontal direction GH. When viewed from the eye point EP, the first image 63 overlaps the second image 36 which is an image of the lower display area 30d reflected in the combiner 5. The boundary line of the first image 63 has the gaps G3 and G4 of the second widths Wd2 between the first image 63 and the second image 36 in the image horizontal direction GH. The shape of the upper display area 30u and the shape of the lower display area 30d are shapes in which the first width Wd1 and the second width Wd2 are made equal to each other. Thus, the vehicle display device 1 of the present embodiment can harmonize the shapes of the upper display area 30u and the second image 36 with the shape of the first image 63 to improve designability.

The vehicle display device 1 of the present embodiment has the mask member 31. The mask member 31 is disposed on the display surface 30 of the image display device 3 and forms the upper display area 30u and the lower display area 30d. The mask member 31 has the upper transmission area 33u, the lower transmission area 33d, and the light-shielding area 33b. The upper transmission area 33u is a light-transmissive area that forms the upper display area 30u. The lower transmission area 33d is a light-transmissive area that forms the lower display area 30d. The light-shielding area 33b is a light-shielding area surrounding the upper transmission area 33u and the lower transmission area 33d. According to the mask member 31, a stepped surface that may be reflected in the combiner 5 can be eliminated.

First Modification of Embodiment

Figure 9:
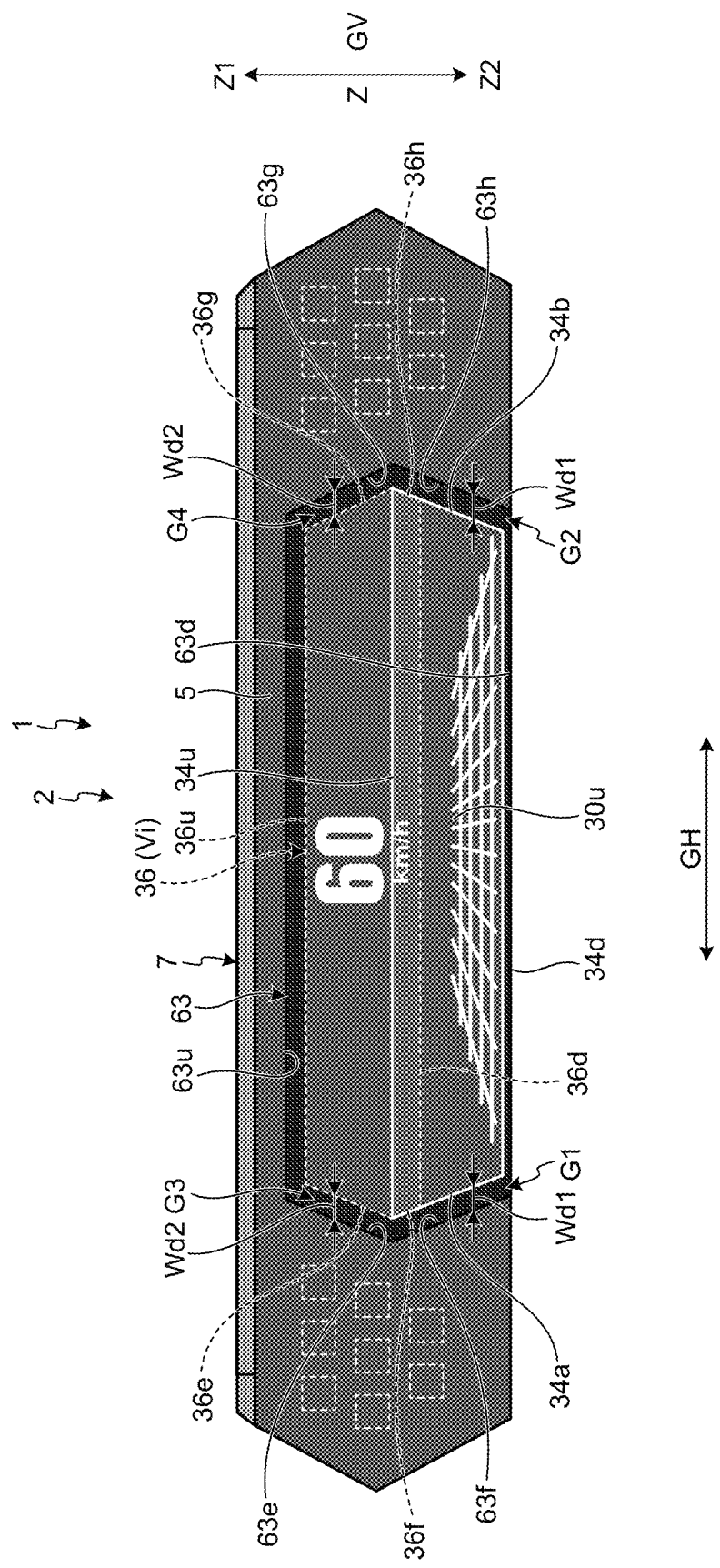
FIG. 9 is a view illustrating an image reflected in a combiner according to a first modification of the embodiment.
Figure 10:
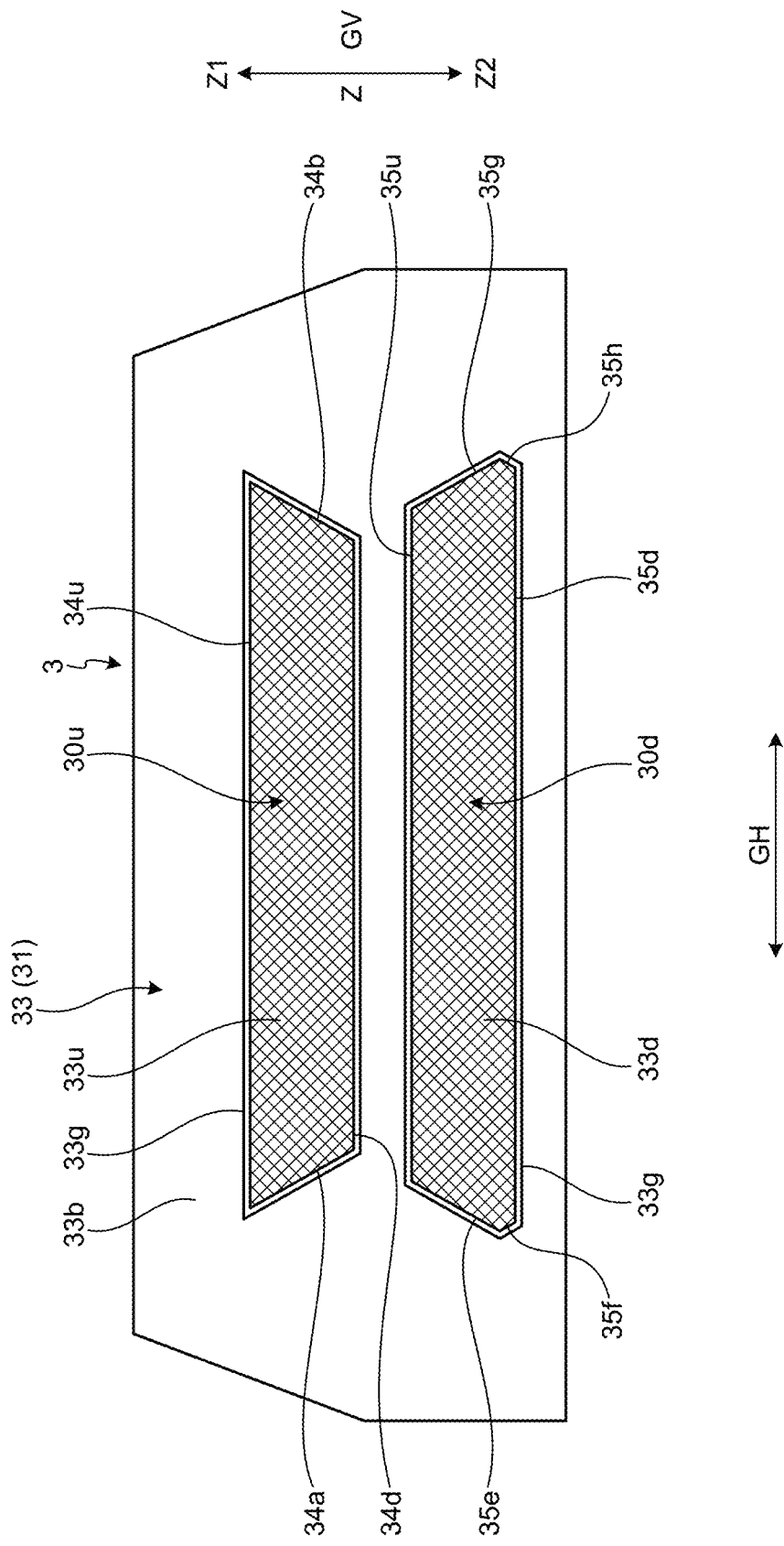
FIG. 10 is a front view of a mask member according to the first modification of the embodiment.

A first modification of the embodiment is described. FIG. 9 is a view illustrating an image reflected in a combiner according to the first modification of the embodiment, and FIG. 10 is a front view of a mask member according to the first modification of the embodiment. The first modification of the embodiment is different from the above embodiment in terms of, for example, the shape of the first image 63, the shape of the upper display area 30u, and the shape of the second image 36.

As illustrated in FIG. 9, a meter display part and a first image 63 according to the first modification of the embodiment each have a hexagonal shape. The meter display part and the first image 63 may each have a shape formed by connecting bottom sides of two trapezoids to each other. The first image 63 is an image of an opening 61 having a hexagonal shape and reflected in the combiner 5. The first image 63 has a first oblique side 63e, a second oblique side 63f, a third oblique side 63g, a fourth oblique side 63h, a top side 63u, and a bottom side 63d.

The first oblique side 63e and the second oblique side 63f are left boundary lines of the first image 63 when viewed from the eye point EP. The first oblique side 63e is located on the upper side Z1 with respect to the second oblique side 63f. The third oblique side 63g and the fourth oblique side 36h are right boundary lines of the first image 63 when viewed from the eye point EP. The third oblique side 63g is located on the upper side Z1 with respect to the fourth oblique side 36h.

The first oblique side 63e and the third oblique side 63g face each other in the image horizontal direction GH. The first oblique side 63e and the third oblique side 63g are inclined with respect to the image vertical direction GV to approach each other toward the upper side Z1. The illustrated first oblique side 63e and third oblique side 63g extend linearly.

The second oblique side 63f and the fourth oblique side 36h face each other in the image horizontal direction GH. The second oblique side 63f and the fourth oblique side 36h are inclined with respect to the image vertical direction GV to approach each other toward the lower side Z2. The illustrated second oblique side 63f and fourth oblique side 36h extend linearly. The top side 63u and the bottom side 63d extend linearly along the image horizontal direction GH, respectively. The length of the top side 63u and the length of the bottom side 63d may be equal to each other.

As illustrated in FIG. 10, the shape of an upper display area 30u according to the first modification of the embodiment is an upside down trapezoid. An upper side 34u and a lower side 34d extend linearly along the image horizontal direction GH, respectively. The length of the upper side 34u is greater than the length of the lower side 34d. A first lateral side 34a and a second lateral side 34b face each other in the image horizontal direction GH. The first lateral side 34a and the second lateral side 34b are inclined with respect to the image vertical direction GV to approach each other toward the lower side Z2.

The shape of a lower display area 30d according to the first modification of the embodiment is substantially trapezoidal. As illustrated in FIG. 10, the lower display area 30d has a first oblique side 35e, a second oblique side 35f, a third oblique side 35g, a fourth oblique side an upper side 35u, and a lower side 35d.

The first oblique side 35e and the second oblique side are left boundary lines in the lower display area 30d when viewed from the eye point EP. The first oblique side is located on the upper side Z1 with respect to the second oblique side 35f. The third oblique side 35g and the fourth oblique side 35h are right boundary lines in the lower display area 30d when viewed from the eye point EP. The third oblique side 35g is located on the upper side Z1 with respect to the fourth oblique side 35h.

The first oblique side 35e and the third oblique side face each other in the image horizontal direction GH. The first oblique side 35e and the third oblique side 35g are inclined with respect to the image vertical direction GV to approach each other toward the upper side Z1. The illustrated first oblique side 35e and third oblique side extend linearly.

The second oblique side 35f and the fourth oblique side 35h are inclined with respect to the image vertical direction GV to approach each other toward the lower side Z2. The illustrated second oblique side 35f and fourth oblique side 35h extend linearly. The upper side 35u and the lower side 35d extend linearly along the image horizontal direction GH, respectively. A gradation area 33g is provided around the upper display area 30u and the lower display area 30d.

FIG. 9 illustrates a second image 36 which is an image of the lower display area 30d reflected in the combiner 5. The second image 36 has a first oblique side 36e, a second oblique side 36f, a third oblique side 36g, a fourth oblique side 36h, an upper side 36u, and a lower side 36d. The first oblique side 36e, the second oblique side 36f, the third oblique edge 36g, the fourth oblique side 36h, the upper side 36u, and the lower side 36d are images of the first oblique side 35e, the second oblique side 35f, the third oblique side 35g, the fourth oblique side 35h, the upper side 35u, and the lower side 35d of the lower display area 30d.

The first oblique side 36e and the second oblique side 36f are left boundary lines of the second image 36 when viewed from the eye point EP. The third oblique edge 36g and the fourth oblique side 36h are right boundary lines of the second image 36 when viewed from the eye point EP. The first oblique side 36e and the third oblique side 36g are inclined with respect to the image vertical direction GV to approach each other toward the upper side Z1. The second oblique side 36f and the fourth oblique side 36h are inclined with respect to the image vertical direction GV to approach each other toward the lower Z2. The upper side 36u and the lower side 36d extend linearly along the image horizontal direction GH.

As in the above embodiment, the first image 63 overlaps the second image 36. The boundary line of the first image 63 has gaps G3 and G4 of second widths Wd2 between the first image 63 and the second image 36 in the image horizontal direction GH. More specifically, the gap G3 is formed between the first oblique side 63e and the second oblique side 63f of the first image 63 and the first oblique side 36e and the second oblique side 36f of the second image 36. The two first oblique sides 36e and 63e are parallel to each other and the two second oblique sides 36f and 63f are parallel to each other.

The gap G4 is formed between the third oblique side 63g and the fourth oblique side 63h of the first image 63 and the third oblique edge 36g and the fourth oblique side 36h of the second image 36. The two third oblique sides 36g and 63g are parallel to each other and the two fourth oblique sides 36h and 63h are parallel to each other. The position and shape of the lower display area 30d are determined so that the left and right gaps G3 and G4 are made equal to each other. Note that the second width Wd2 of the gap G3 and the second width Wd2 of the gap G4 are equal to each other, for example, when the eye point EP is located in the center of the eye range.

The first image 63 overlaps the upper display area 30u. The boundary line of the first image 63 has gaps G1 and G2 of first widths Wd1 between the first image 63 and the upper display area 30u in the image horizontal direction GH. The gap G1 is formed between the second oblique side 63f of the first image 63 and the first lateral side 34a of the upper display area 30u. The gap G2 is formed between the fourth oblique side 63h of the first image 63 and the second lateral side 34b of the upper display area 30u. The position and shape of the upper display area 30u are determined so that the left and right gaps G1 and G2 are made equal to each other. Note that the first width Wd1 of the gap G1 and the first width Wd1 of the gap G2 are equal to each other, for example, when the eye point EP is located in the center of the eye range.

A part of the second image 36 on the lower side Z2 overlaps the upper display area 30u. More specifically, a portion of the second image 36 between the second oblique side 36f and the fourth oblique side 36h is superimposed on the upper display area 30u.

As illustrated in FIG. 9, the first width Wd1 and the second width Wd2 have similar values. That is, the gaps G3 and G1 continuous with the same width are formed from the upper end of the second image 36 to the lower end of the upper display area 30u. The gaps G4 and G2 continuous with the same width are formed from the upper end of the second image 36 to the lower end of the upper display area 30u.

As described above, in the vehicle display device 1 according to the first modification of the embodiment, the shape of the upper display area 30u and the shape of the lower display area 30d are shapes in which the first width Wd1 and the second width Wd2 are made equal to each other. Thus, the vehicle display device 1 according to the first modification of the embodiment can improve designability.

Second Modification of Embodiment

Figure 11:
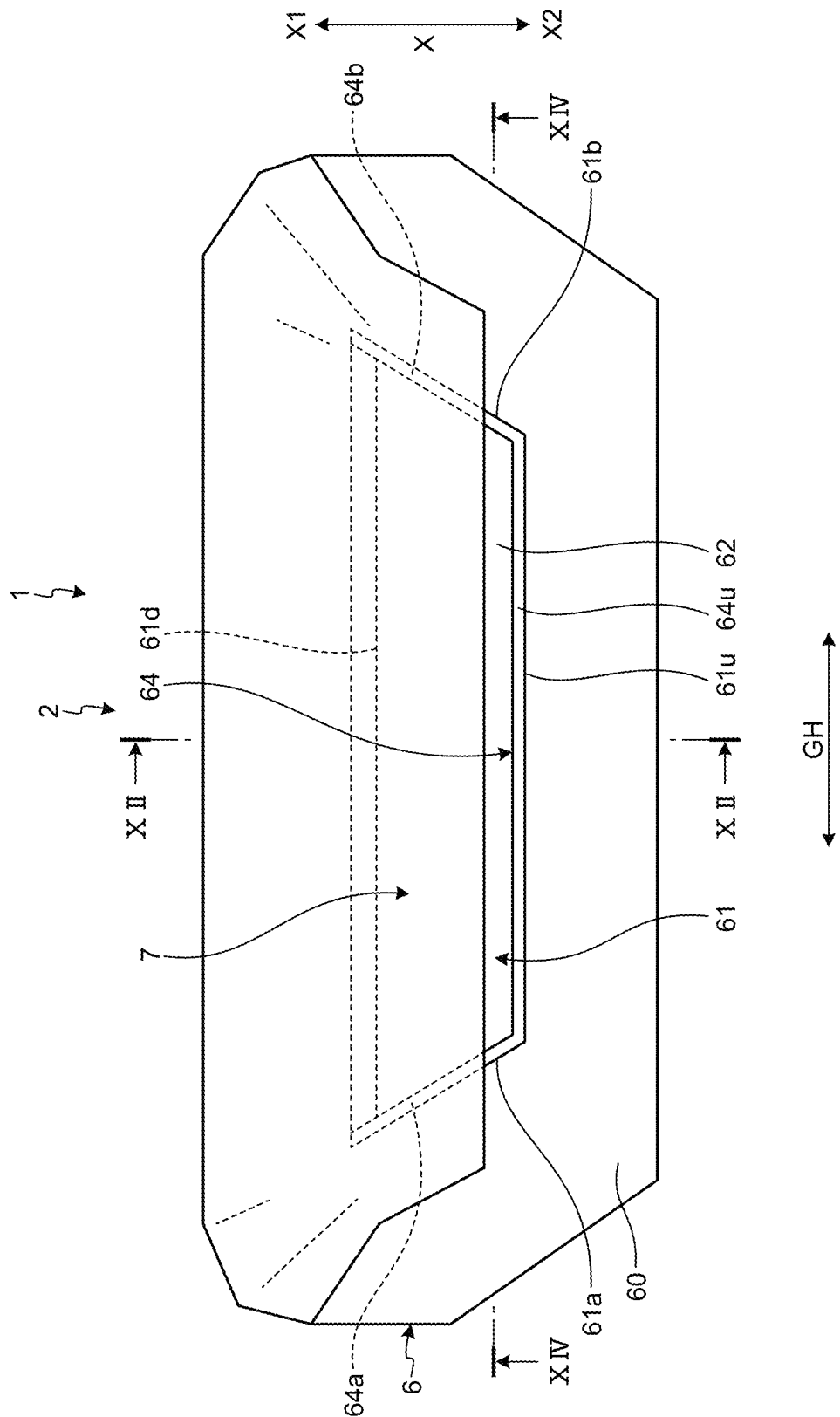
FIG. 11 is a plan view of a hood part and an accommodating part according to a second modification of the embodiment.
Figure 12:
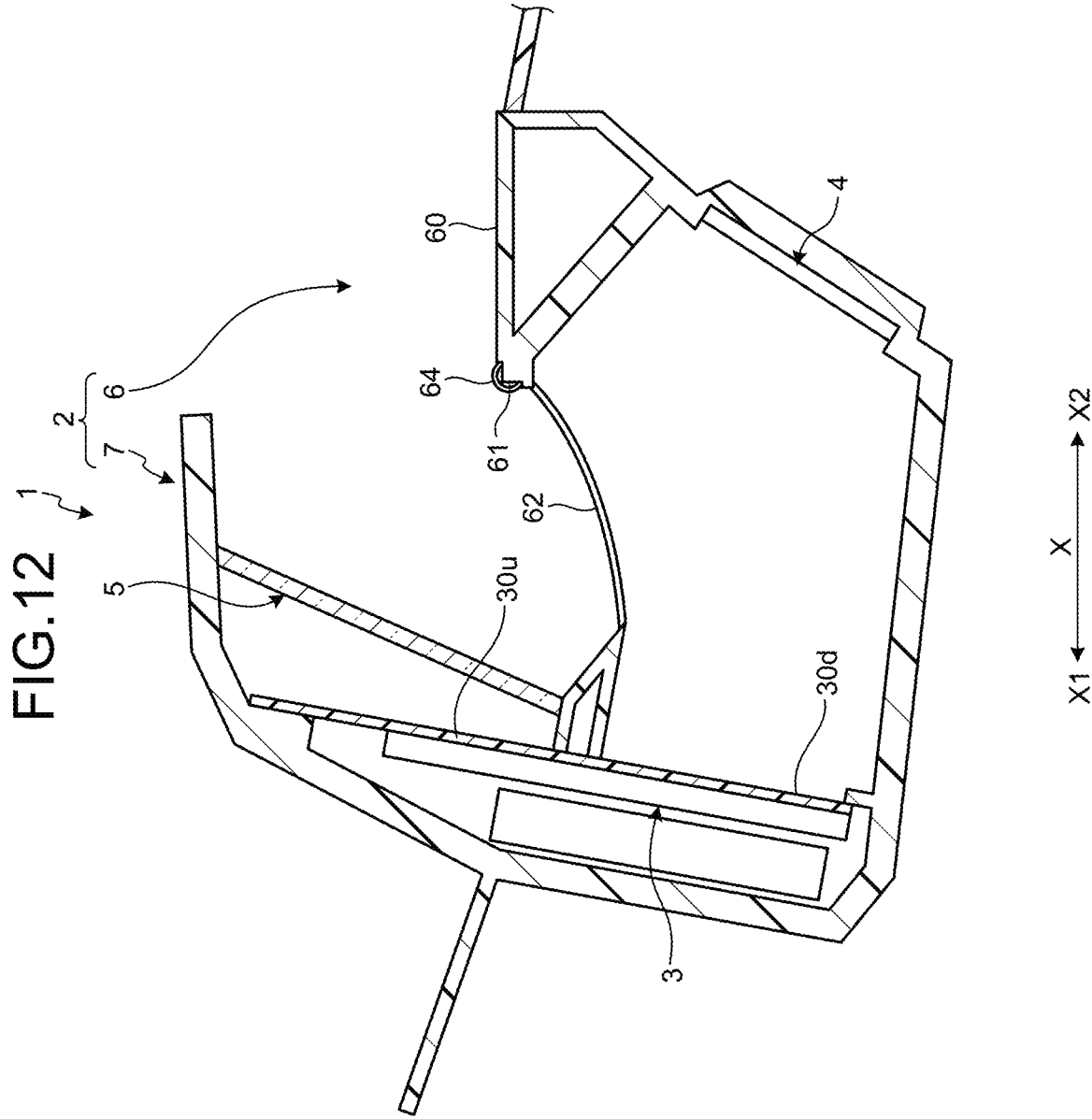
FIG. 12 is a cross-sectional view of a vehicle display device according to the second modification of the embodiment.
Figure 13:
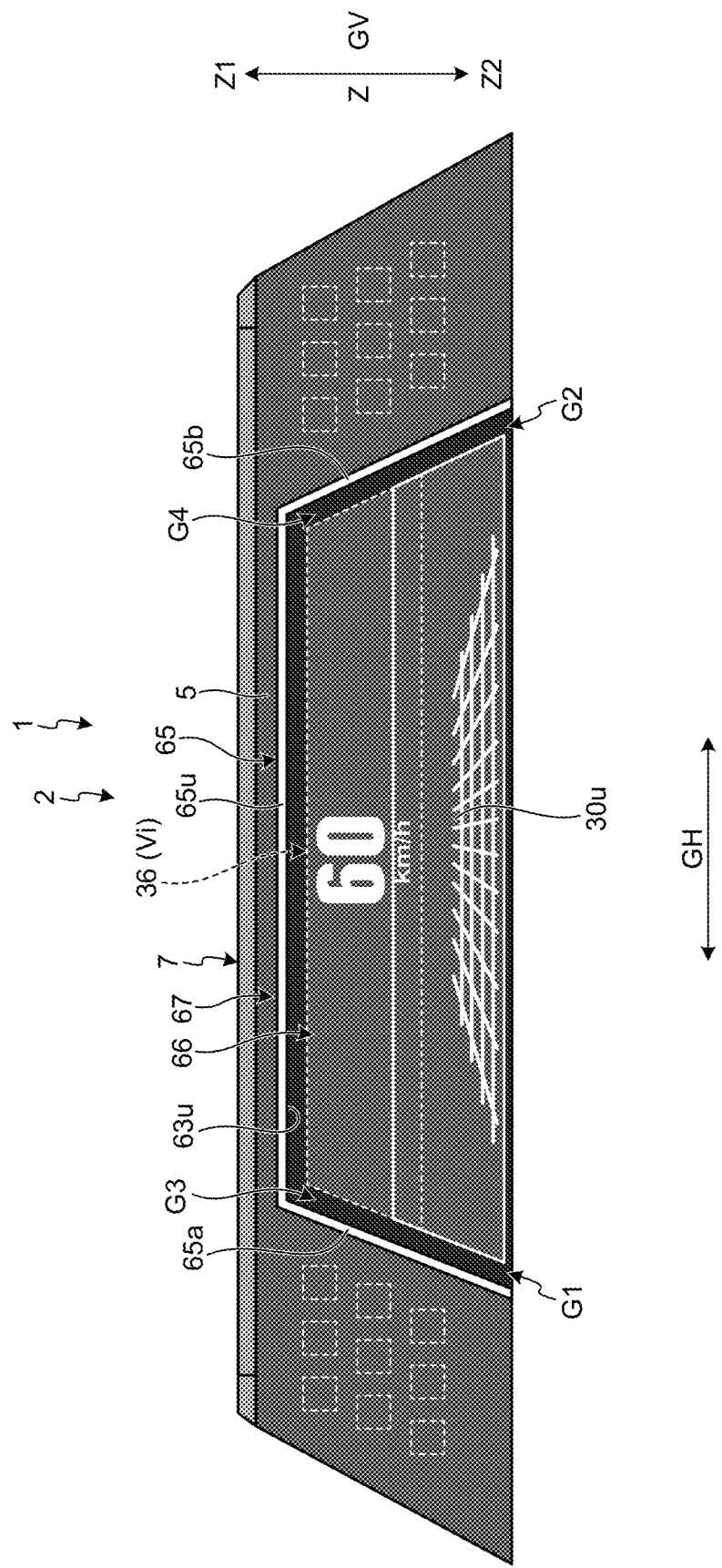
FIG. 13 is a view illustrating an image reflected in a combiner according to the second modification of the embodiment.
Figure 14:
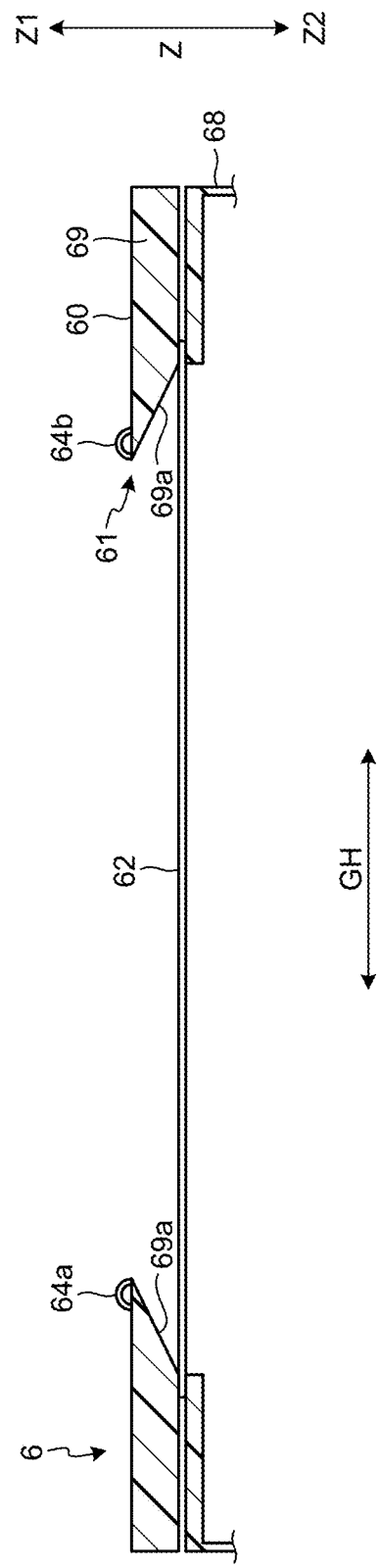
FIG. 14 is a cross-sectional view of a cover and the accommodating part according to the second modification of the embodiment.

A second modification of the embodiment is described. FIG. 11 is a plan view of a hood part and an accommodating part according to the second modification of the embodiment, FIG. 12 is a cross-sectional view of a vehicle display device according to the second modification of the embodiment, FIG. 13 is a view illustrating an image reflected in a combiner according to the second modification of the embodiment, and FIG. 14 is a cross-sectional view of a cover and the accommodating part according to the second modification of the embodiment.

As illustrated in FIG. 11, a vehicle display device 1 according to the second modification of the embodiment has a decorative member 64. The decorative member 64 is disposed at an edge surrounding the opening 61 and surrounds the opening 61. The shape of the opening 61 is trapezoidal, similar to the above embodiment. The decorative member 64 has a first oblique side portion 64a, a second oblique side portion 64b, and a top side portion 64u.

The first oblique side portion 64a is located on the first oblique side 61a of the opening 61. The second oblique side portion 64b is located on the second oblique side 61b. The top side portion 64u is located on the top side 61u. That is, the decorative member 64 surrounds the opening 61 from both sides in the image horizontal direction GH and from the rear side X2.

At least one of the material, color tone, and texture of the decorative member 64 is different from the material, color tone, and texture of the instrument panel surface 60. The instrument panel surface 60 constitutes a part of the instrument panel 120. The instrument panel surface 60 is, for example, a textured surface of a resin member, and has low saturation and lightness. The decorative member 64 may have a smooth surface to have gloss, for example. The decorative member 64 may be a metal member or a member with a plated surface. As an example, the decorative member 64 may be a metallic molding. The decorative member 64 may have high saturation and lightness.

The decorative member 64 illustrated in FIG. 12 is a member having an arc-shaped cross-section. The decorative member 64 covers the edge of the opening 61. In other words, the decorative member 64 covers the edges of the instrument panel surface 60.

FIG. 13 illustrates a third image 65 which is an image of the decorative member 64 reflected in the combiner 5. The third image 65 has a first oblique side portion 65a, a second oblique side portion 65b, and a top side portion 65u. The first oblique side portion 65a, the second oblique side portion 65b, and the top side portion 65u are images of the first oblique side portion 64a, the second oblique side portion 64b, and the top side portion 64u of the decorative member 64.

The third image 65 divides a meter display area 66 from a peripheral area 67. The meter display area 66 is an area including the upper display area 30u and the second image 36. The instrument panel surface 60 of the accommodating part 6 is reflected in the peripheral area 67. The third image 65 makes it easier for a user to recognize the meter display area 66 and the peripheral area 67 as completely different areas. When the third image 65 is not present, a user may be conscious of the instrument panel surface 60 and feel uncomfortable as if the user is looking at a hole in the instrument panel surface 60. The vehicle display device 1 of the present modification is less likely to cause such a sense of discomfort to a user.

As illustrated in FIG. 14, the accommodating part 6 is configured so that end faces of members holding the cover 62 are not easily visually recognized. The accommodating part 6 has a main body 68 and a lid member 69. The main body 68 accommodates the lower display area 30d and the reflective member 4. The lid member 69 is engaged with an opening of the main body 68 on the upper side Z1. The instrument panel surface 60 is a surface of the lid member 69 facing the upper side Z1. The cover 62 is interposed and held between the main body 68 and the lid member 69.

The lid member 69 has an end surface 69a corresponding to the opening 61. The end surface 69a is inclined with respect to the vehicle vertical direction Z to face the lower side Z2. Thus, the end surface 69a is not reflected in the combiner 5, so that the third image 65 can stand out as a boundary.

Third Modification of Embodiment

Figure 15:
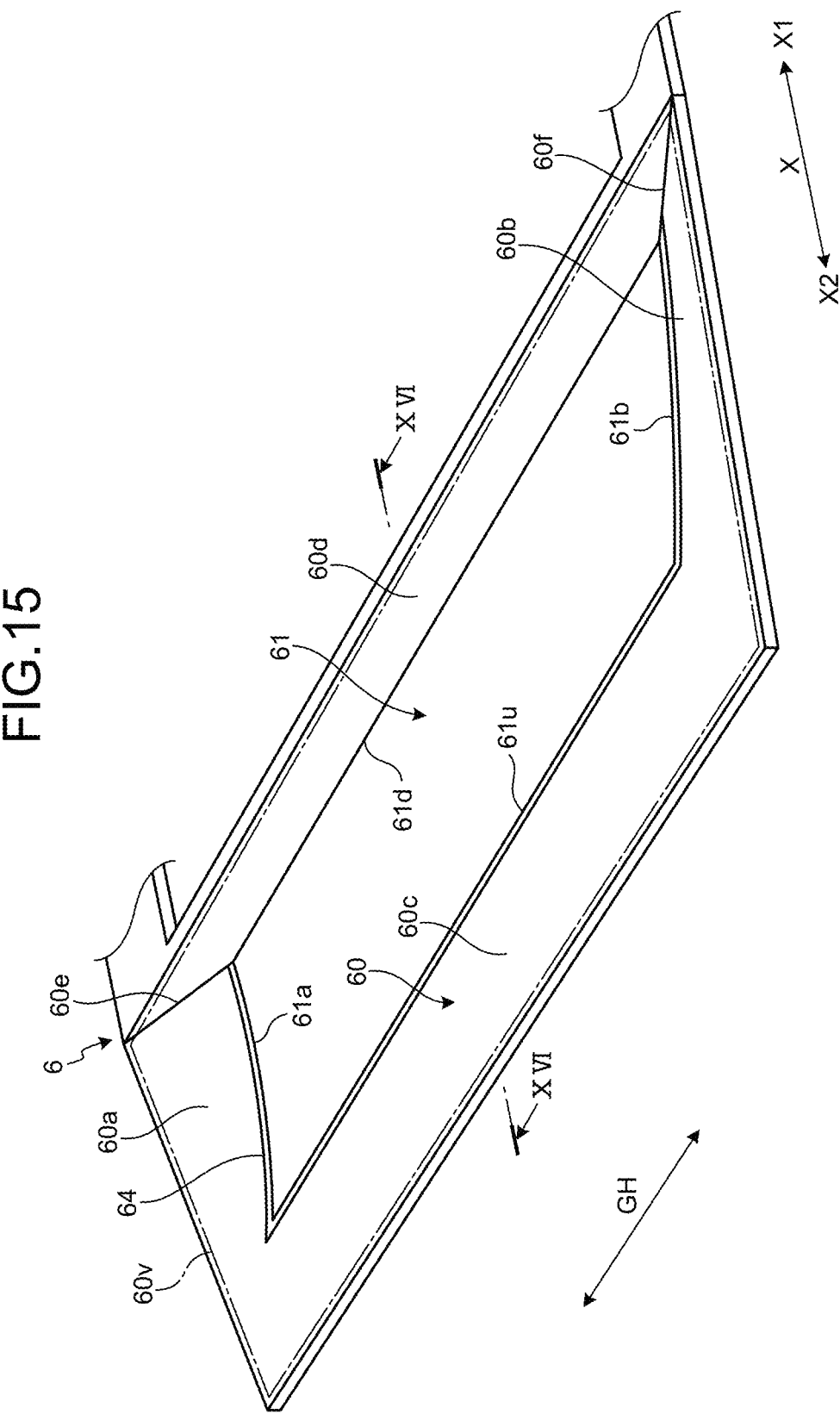
FIG. 15 is a perspective view of an accommodating part according to a third modification of the embodiment.
Figure 16:
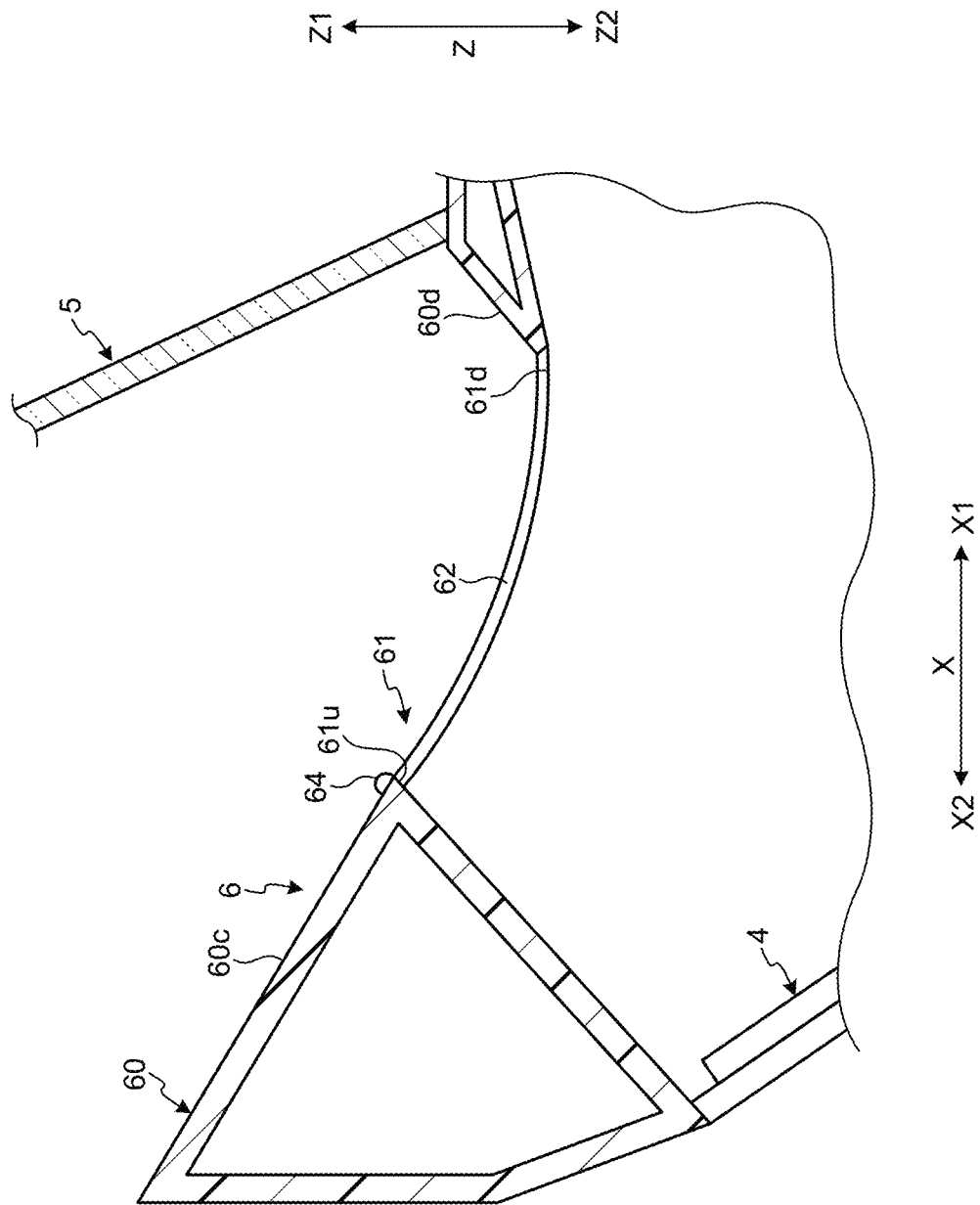
FIG. 16 is a cross-sectional view of the accommodating part according to the third modification of the embodiment.

A third modification of the embodiment is described. An instrument panel surface 60 according to the third modification of the embodiment has an inclined surface that produces a sense of depth. FIG. 15 is a perspective view of an accommodating part according to the third modification of the embodiment, FIG. 16 is a cross-sectional view of the accommodating part according to the third modification of the embodiment, and FIG. 17 is a view illustrating an image reflected in a combiner according to the third modification of the embodiment.

FIG. 15 illustrates the instrument panel surface 60 configured by an inclined surface. The instrument panel surface 60 is formed in a frame shape surrounding an opening 61. The instrument panel surface 60 has a visible area 60v. The visible area 60v is an area visually recognized from the eye point EP by being reflected by the combiner 5. In the instrument panel surface 60 illustrated in FIG. 15, the entire instrument panel surface 60 is the visible area 60v. The visible area 60v has a first inclined surface 60a, a second inclined surface 60b, a third inclined surface 60c, and a fourth inclined surface 60d.

The first inclined surface 60a is adjacent to a first oblique side 61a of the opening 61. The second inclined surface 60b is adjacent to a second oblique side 61b of the opening 61. The third inclined surface 60c is adjacent to a top side 61u of the opening 61. The fourth inclined surface 60d is adjacent to a bottom side 61d of the opening 61.

The four inclined surfaces 60a, 60b, 60c, and 60d are inclined toward the inside of the accommodating part 6 as the opening 61 is approached. For example, as illustrated in FIG. 16, the third inclined surface 60c is inclined toward the inside of the accommodating part 6 as the top side 61u is approached. The fourth inclined surface 60d is inclined toward the inside of the accommodating part 6 as the bottom side 61d is approached. Similarly, the first inclined surface 60a is inclined toward the inside of the accommodating part 6 as the first oblique side 61a is approached. The second inclined surface 60b is inclined toward the inside of the accommodating part 6 as the second oblique side 61b is approached.

An end of the third inclined surface 60c in the image horizontal direction GH is connected to the first inclined surface 60a and the second inclined surface 60b while forming a curved surface. An end of the fourth inclined surface 60d in the image horizontal direction GH is connected to the first inclined surface 60a and the second inclined surface 60b while forming intersection lines 60e and 60f.

FIG. 17 illustrates a fourth image 70 which is an image of the instrument panel surface 60 reflected in the combiner 5. The fourth image 70 has a first area 70a, a second area 70b, a top area 70u, and a lower area 70d. The first area 70a, the second area 70b, the top area 70u, and the lower area 70d are images of the first inclined surface 60a, the second inclined surface 60b, the third inclined surface 60c, and the fourth inclined surface 60d.

Shading occurs on the instrument panel surface 60 configured by a plurality of inclined surfaces. This shading can allow the fourth image 70 to give a user a sense of depth. In the illustrated fourth image 70, the top area 70u and the lower area 70d are brighter than the first area 70a and the second area 70b. A boundary line 72 with varying brightness is formed at the boundary of each area. The boundary line 72 extends from corners of the fourth image 70 toward the central portion of the meter display area 66. Thus, the fourth image 70 can produce a sense of depth.

When viewed from the eye point EP, the first area 70a and the second area 70b are visually recognized as inclined surfaces directed toward the back side as the meter display area 66 is approached. When viewed from the eye point EP, the top area 70u is visually recognized as an inclined surface directed toward the back side as the lower side Z2 is approached. When viewed from the eye point EP, the lower region 70d is visually recognized as an inclined surface toward the back side as the upper side Z1 is approached.

In this way, the fourth image 70, when viewed from the eye point EP, is configured by four inclined surfaces directed toward the back side as the center of the meter display area 66 is approached. The fourth image 70 can allow a user to feel a sense of depth.

Fourth Modification of Embodiment

A fourth modification of the embodiment is described. FIG. 18 is a front view of a combiner according to the fourth modification of the embodiment. A boundary line surrounding a meter display area may be provided on a combiner 5. FIG. 18 illustrates the combiner 5 subjected to decoration. The combiner 5 has a meter display area 50, a peripheral area 51, and a decorative area 52. The meter display area 50 is an area that transmits display light of the upper display area 30u and reflects display light of the lower display area 30d toward the eye point EP. The meter display area 50 is configured by a half mirror, smoked acrylic, or the like. The meter display area 50 is an area facing the upper display area 30u.

The peripheral area 51 is an area surrounding the meter display area 50. The peripheral area 51 is treated to suppress light reflection by mask printing or the like on a reflective surface 5a. The peripheral area 51, for example, has low saturation and lightness. The peripheral area 51 can reduce the reflection of the instrument panel surface 60, thereby making it less likely to cause discomfort to a user. In this example, the reflective surface 5a and the peripheral area 51 are separated from each other by a process on the same member, but the same effect can be achieved with a combination of different members.

The decorative area 52 is disposed at the boundary between the meter display area 50 and the peripheral area 51. The decorative area 52 is a clear boundary line dividing the meter display area 50 from the peripheral area 51. The decorative area 52 is formed, for example, by printing on the reflective surface 5a. The decorative area 52, for example, has higher saturation and lightness than the peripheral area 51. The decorative area 52 may be glossy. Note that a member having a three-dimensional shape similar to the decorative member 64 may be disposed in the decorative area 52.

The contents disclosed in the above embodiment and modifications can be combined and implemented as appropriate.

In a vehicle display device according to the above embodiment and modifications, a first image, which is an image of an opening reflected in a combiner, overlaps an upper display area of an image display device and a second image which is an image of a lower display area. A boundary line of the first image has a gap of a first width between the first image and the upper display area and has a gap of a second width between the first image and the second image. A shape of the upper display area and a shape of the lower display area are shapes in which the first width and the second width are made equal to each other. The vehicle display device according to the present invention can harmonize the shapes of the upper display area and the second image with the shape of the first image to improve designability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    an image display device including an upper display area and a lower display area displaying an image, the upper display area being disposed to face an eye point of a vehicle;
    a combiner disposed on a side of the eye point with respect to the upper display area;
    an accommodating part that accommodates the lower display area and is formed with an opening facing upward, the opening being located on the side of the eye point with respect to the image display device;
    a hood part that covers the upper display area from above; and
    a reflective member disposed inside the accommodating part, facing the combiner through the opening, and reflecting the lower display area toward the combiner, wherein
    the combiner reflects the lower display area and the opening reflected by the reflective member toward the eye point, respectively,
    when viewed from the eye point, a first image overlaps the upper display area and a boundary line of the first image has a gap of a first width between the first image and the upper display area in an image horizontal direction, the first image being an image of the opening reflected in the combiner,
    when viewed from the eye point, the first image overlaps a second image and the boundary line of the first image has a gap of a second width between the first image and the second image in the image horizontal direction, the second image being an image of the lower display area reflected in the combiner, and
    a shape of the upper display area and a shape of the lower display area are shapes in which the first width and the second width are made equal to each other.

2. The vehicle display device according to claim 1, further comprising:
    a mask member disposed on a display surface of the image display device and forming the upper display area and the lower display area, wherein
    the mask member includes an upper transmission area being a light-transmissive area that forms the upper display area, a lower transmission area being a light-transmissive area that forms the lower display area, and a light-shielding area surrounding the upper transmission area and the lower transmission area.

3. The vehicle display device according to claim 2, further comprising:
    a decorative member disposed at an edge surrounding the opening in the accommodating part and surrounding the opening.

4. The vehicle display device according to claim 3, wherein
    the accommodating part includes an instrument panel surface formed with the opening,
    the instrument panel surface includes a visible area visually recognized from the eye point by being reflected by the combiner, and
    the visible area is inclined toward an inside of the accommodating part as approaching to the opening.

5. The vehicle display device according to claim 2, wherein
    the accommodating part includes an instrument panel surface formed with the opening, the instrument panel surface includes a visible area visually recognized from the eye point by being reflected by the combiner, and the visible area is inclined toward an inside of the accommodating part as approaching to the opening.

6. The vehicle display device according to claim 1, further comprising:

a decorative member disposed at an edge surrounding the opening in the accommodating part and surrounding the opening.

7. The vehicle display device according to claim 6, wherein the accommodating part includes an instrument panel surface formed with the opening, the instrument panel surface includes a visible area visually recognized from the eye point by being reflected by the combiner, and the visible area is inclined toward an inside of the accommodating part as approaching to the opening.

8. The vehicle display device according to claim 1, wherein the accommodating part includes an instrument panel surface formed with the opening, the instrument panel surface includes a visible area visually recognized from the eye point by being reflected by the combiner, and the visible area is inclined toward an inside of the accommodating part as approaching to the opening.

\* \* \* \* \*